(12) United States Patent
Suzuki et al.

(10) Patent No.: US 9,439,178 B2
(45) Date of Patent: Sep. 6, 2016

(54) WIRELESS COMMUNICATION SYSTEM, MOBILE STATION DEVICE, BASE STATION DEVICE, WIRELESS COMMUNICATION METHOD, AND INTEGRATED CIRCUIT

(75) Inventors: Shoichi Suzuki, Osaka (JP); Tatsushi Aiba, Osaka (JP); Yosuke Akimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 196 days.

(21) Appl. No.: 13/883,322

(22) PCT Filed: Nov. 4, 2011

(86) PCT No.: PCT/JP2011/075371
§ 371 (c)(1),
(2), (4) Date: Jun. 5, 2013

(87) PCT Pub. No.: WO2012/060433
PCT Pub. Date: May 10, 2012

(65) Prior Publication Data
US 2013/0242922 A1   Sep. 19, 2013

(30) Foreign Application Priority Data

Nov. 5, 2010   (JP) .................................. 2010-248569

(51) Int. Cl.
| | |
|---|---|
| *H04W 72/04* | (2009.01) |
| *H04L 1/16* | (2006.01) |
| *H04L 1/18* | (2006.01) |
| *H04L 1/00* | (2006.01) |
| *H04L 5/00* | (2006.01) |
| *H04L 25/03* | (2006.01) |

(52) U.S. Cl.
CPC ........ *H04W 72/0413* (2013.01); *H04L 1/0041* (2013.01); *H04L 1/0054* (2013.01); *H04L 1/0057* (2013.01); *H04L 1/0071* (2013.01); *H04L 1/0073* (2013.01); *H04L 1/1607* (2013.01); *H04L 1/1861* (2013.01); *H04L 5/001* (2013.01); *H04L 25/03904* (2013.01)

(58) Field of Classification Search
None
See application file for complete search history.

(56) References Cited

U.S. PATENT DOCUMENTS

2009/0245421 A1*  10/2009  Montojo et al. .............. 375/298
2011/0176443 A1*  7/2011  Astely et al. ................. 370/252

FOREIGN PATENT DOCUMENTS

WO   WO 2012/024222 A2   2/2012

OTHER PUBLICATIONS

3GPP TSG RAN WG1 Meeting #61, R1-103067, "UCI Transmission in the Presence of UL-SCH Data",Research in Motion, UK Limited, Agenda Item: 6.2.4.3, May 10-14, 2010.
(Continued)

*Primary Examiner* — Thai Nguyen
(74) *Attorney, Agent, or Firm* — Birch, Stewart, Kolash & Birch, LLP

(57) ABSTRACT

A mobile station device efficiently transmits an ACK/NACK of more than 11 bits on a physical uplink channel. A mobile station device for communicating with a base station device divides a plurality of ACKs/NACKs indicating success or failure of decoding of a plurality of pieces of uplink data received from the base station device, separately encodes the divided ACKs/NACKs, and changes a method for concatenating the encoded bits of the separately encoded ACKs/NACKs in accordance with whether the ACKs/NACKs are to be transmitted on a physical uplink control channel or a physical uplink shared channel.

13 Claims, 14 Drawing Sheets

(56) References Cited

OTHER PUBLICATIONS

3GPP TSG RAN WG1 Meeting #62, R1-104313, "Details on ACK/NAK transmission for CA", CATT, Agenda Item: 6.2.2.1, Aug. 23-27, 2010.
3GPP TSG RAN WG1 Meeting #62, R1-104431, "UL ACK/NAK Feedback in LTE-A TDD", Nokia, Nokia Siemens Networks, Agenda item: 6.2.2.1, Aug. 23-27, 2010.
3GPP TSG RAN WG1 Meeting #62, R1-104433, "UL ACK/NAK Feedback for Power-Limited UE in LTE-A TDD", Nokia, Nokia Siemens Networks, Agenda item: 6.2.2.1, Aug. 23-27, 2010.
3GPP TSG RAN WG1 Meeting #62bis, R1-105246, "ACK/NACK transmission schemes for TDD in LTE-A", Huawei, HiSilicon, Agenda Item: 6.2.1.1, Oct. 11-15, 2010.
3GPP TSG RAN WG1 meeting #62bis, R1-105247, "A/N coding schemes for large payload using DFT-S-OFDM", Huawei, HiSilicon, Agenda Item:6.2.1.1, Oct. 11-15, 2010.
International Search Report, mailed Dec. 6, 2011, issued in PCT/JP2011/075371.
TSG-RAN WG1 Meeting #62bis, R1-105776, "Way forward on Supporting ACK/NAK Payload Larger than 11 Bits in Rel-10 TDD", CMCC, CATT, CATR, Ericsson, ST-Ericsson, Huawei, HiSilicon, III, New Postcom, Potevio, ZTE, Oct. 11-15, 2010.
Catt, "UL ACK/NAK transmission for TDD with CA," 3GPP TSG RAN WG1 Meeting #61bis, R1-103469, Dresden, Germany, Jun. 28-Jul. 2, 2010, 3 pages.

\* cited by examiner

FIG. 8

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 0 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

WIRELESS COMMUNICATION SYSTEM, MOBILE STATION DEVICE, BASE STATION DEVICE, WIRELESS COMMUNICATION METHOD, AND INTEGRATED CIRCUIT

TECHNICAL FIELD

The present invention relates to a wireless communication system, a mobile station device, a base station device, a wireless communication method, and an integrated circuit.

BACKGROUND ART

Evolved radio access schemes and radio networks for cellular mobile communication (hereinafter referred to as "Long Term Evolution (LTE)" or "Evolved Universal Terrestrial Radio Access (EUTRA)") have been studied by the 3rd Generation Partnership Project (3GPP). In LTE, the Orthogonal Frequency Division Multiplexing (OFDM) scheme, which is a multi-carrier transmission scheme, is used as a communication scheme for wireless communication from a base station device to a mobile station device (downlink). Further, the SC-FDMA (Single-Carrier Frequency Division Multiple Access) scheme, which is a single-carrier transmission scheme, is used as a communication scheme for wireless communication from a mobile station device to a base station device (uplink).

In LTE, an ACK (Acknowledgement)/NACK (Negative Acknowledgement) (also referred to as HARQ-ACK) indicating whether or not a mobile station device has succeeded in decoding downlink data received on the Physical Downlink Shared Channel (PDSCH) is transmitted on the Physical Uplink Control Channel (PUCCH) or Physical Uplink Shared Channel (PUSCH). If a mobile station device is not allocated radio resources for the PUSCH when transmitting an ACK/NACK, the ACK/NACK is transmitted on the PUCCH. If a mobile station device is allocated radio resources for the PUSCH when transmitting an ACK/NACK, the ACK/NACK is transmitted on the PUSCH. In LTE, in a case where an ACK/NACK of 3 bits or more is to be transmitted on the PUSCH, the ACK/NACK is encoded using Reed-Muller code to generate a 32-bit encoded ACK/NACK bit sequence.

In LTE-A, when transmitting an ACK/NACK of more than 12 bits on the PUCCH, the division of an ACK/NACK sequence into two ACK/NACK sequences and the separate encoding of two ACK/NACK segments using Reed-Muller code are being studied (NPL 1).

In 3GPP, radio access schemes and radio networks implementing higher-speed data communication by using a frequency band broader than that of LTE (hereinafter referred to as "Long Term Evolution-Advanced (LTE-A)" or "Advanced Evolved Universal Terrestrial Radio Access (A-EUTRA)") having backward compatibility with LTE is being studied. That is, an LTE-A base station device is capable of simultaneously performing wireless communication with LTE-A and LTE mobile station devices, and an LTE-A mobile station device is capable of performing wireless communication with LTE-A and LTE base station devices. LTE-A adopts the same channel structure as LTE.

In LTE-A, a technology in which a plurality of frequency bands (hereinafter referred to as "Component Carriers (CCs)") or cells having the same channel structure as in LTE are used and combined into a single frequency band (broad frequency band) for use (also referred to as carrier aggregation, cell aggregation, etc.) has been proposed. For example, communication with frequency band aggregation enables a base station device to simultaneously transmit a plurality of uplink grants to a mobile station device using one or a plurality of Downlink Component Carriers (DL CCs) or cells, and enables the mobile station device to simultaneously transmit a plurality of PUSCHs to the base station device using radio resources of a plurality of Uplink Component Carriers (UL CCs) or cells, the radio resources being allocated by the plurality of simultaneously received uplink grants.

In LTE-A, when transmitting to a base station device a plurality of ACKs/NACKs individually for a plurality of PUSCHs simultaneously received by a mobile station device, the mobile station device transmitting uplink data (information channel in the higher layer) (Uplink Shared Channel: UL-SCH) and the plurality of ACKs/NACKs using one of the plurality of PUSCHs transmitted by the mobile station device is being studied (NPL 2).

CITATION LIST

Non Patent Literature

NPL 1: "Way forward on Supporting ACK/NAK Payload Larger than 11 Bits in Rel-10 TDD", 3GPP TSG RAN WG1 Meeting #62bis, R1-105776, Oct. 11-15, 2010.

NPL 2: "UCI Transmission in the Presence of UL-SCH Data", 3GPP TSGRAN WG1 Meeting #61, R1-103067, May 10-14, 2010.

SUMMARY OF INVENTION

Technical Problem

However, the related art does not disclose a detailed method for transmitting an ACK/NACK of more than 11 bits on a single PUSCH.

The present invention has been made in view of the foregoing points, and an object thereof is to provide a wireless communication system, a mobile station device, a base station device, a wireless communication method, and an integrated circuit, which enable a mobile station device to efficiently transmit an ACK/NACK of more than 11 bits on a physical uplink channel.

Solution to Problem (1) In order to achieve the object described above, the present invention has taken the following measures. That is, a wireless communication system according to the present invention is a wireless communication system including a base station device and a mobile station device which communicate with each other. The mobile station device generates two ACK/NACK sequences from ACKs/NACKs for transport blocks received from the base station device, separately encodes the two ACK/NACK sequences to generate two coded bit sequences, concatenates the two coded bit sequences using different methods in accordance with whether the ACKs/NACKs are to be transmitted on a physical uplink control channel or on a physical uplink shared channel, and transmits a signal generated from the concatenated coded bit sequence to the base station device. The base station device receives the signal from the mobile station device, and performs a decoding process of the ACKs/NACKs from the received signal.

(2) Further, a mobile station device according to the present invention is a mobile station device for communicating with a base station device. The mobile station device generates two ACK/NACK sequences from ACKs/NACKs for transport blocks received from the base station device, separately encodes the two ACK/NACK sequences to generate two coded bit sequences, concatenates the two coded bit sequences using different methods in accordance with whether the ACKs/NACKs are to be transmitted on a physical uplink control channel or on a physical uplink shared channel, and transmits a signal generated from the concatenated coded bit sequence to the base station device.

(3) Further, in the mobile station device according to the present invention, the methods for concatenation include a method for alternately concatenating the two coded bit sequences in units of a certain number of bits.

(4) Further, in the mobile station device according to the present invention, the methods for concatenation include a method for concatenating one of the two coded bit sequences with the least significant bit of the other coded bit sequence.

(5) Further, a base station device according to the present invention is a base station device for communicating with a mobile station device. The mobile station device generates two ACK/NACK sequences from ACKs/NACKs for transport blocks received from the base station device, separately encodes the two ACK/NACK sequences to generate two coded bit sequences, and concatenates the two coded bit sequences using different methods in accordance with whether the ACKs/NACKs are to be transmitted on a physical uplink control channel or on a physical uplink shared channel, and the base station device receives a signal generated from the concatenated coded bit sequence.

(6) Further, a wireless communication method according to the present invention is a wireless communication method used in a mobile station device that communicates with a base station device. The wireless communication method includes a step of generating two ACK/NACK sequences from ACKs/NACKs for transport blocks received from the base station device, and separately encoding the two ACK/NACK sequences to generate two coded bit sequences, a step of concatenating the two coded bit sequences using different methods in accordance with whether the ACKs/NACKs are to be transmitted on a physical uplink control channel or on a physical uplink shared channel, and a step of transmitting a signal generated from the concatenated coded bit sequence to the base station device.

(7) Further, in the wireless communication method according to the present invention, the methods for concatenation include a method for alternately concatenating the two coded bit sequences in units of a certain number of bits.

(8) Further, in the wireless communication method according to the present invention, the methods for concatenation include a method for concatenating one of the two coded bit sequences with the least significant bit of the other coded bit sequence.

(9) Further, a wireless communication method according to the present invention is a wireless communication method used in a base station device that communicates with a mobile station device. The wireless communication method includes means for, using the mobile station device, generating two ACK/NACK sequences from ACKs/NACKs for transport blocks received from the base station device, separately encoding the two ACK/NACK sequences to generate two coded bit sequences, and concatenating the two coded bit sequences using different methods in accordance with whether the ACKs/NACKs are to be transmitted on a physical uplink control channel or on a physical uplink shared channel, and receiving a signal generated from the concatenated coded bit sequence.

(10) Further, an integrated circuit according to the present invention is an integrated circuit used in a mobile station device that communicates with a base station device. The integrated circuit includes a function for generating two ACK/NACK sequences from ACKs/NACKs for transport blocks received from the base station device, a function for separately encoding the two ACK/NACK sequences to generate two coded bit sequences, and a function for concatenating the two coded bit sequences using different methods in accordance with whether the ACKs/NACKs are to be transmitted on a physical uplink control channel or on a physical uplink shared channel, and transmitting a signal generated from the concatenated coded bit sequence to the base station device.

(11) Further, in the integrated circuit according to the present invention, the methods for concatenation include a method for alternately concatenating the two coded bit sequences in units of a certain number of bits.

(12) Further, in the integrated circuit according to the present invention, the methods for concatenation include a method for concatenating one of the two coded bit sequences with the least significant bit of the other coded bit sequence.

(13) Further, an integrated circuit according to the present invention is an integrated circuit used in a base station device that communicates with a mobile station device, the integrated circuit includes a function for, using the mobile station device, generating two ACK/NACK sequences from ACKs/NACKs for transport blocks received from the base station device, separately encoding the two ACK/NACK sequences to generate two coded bit sequences, and concatenating the two coded bit sequences using different methods in accordance with whether the ACKs/NACKs are to be transmitted on a physical uplink control channel or on a physical uplink shared channel, and receiving a signal generated from the concatenated coded bit sequence.

Advantageous Effects of Invention

According to this invention, a mobile station device is capable of efficiently transmitting an ACK/NACK of more than 11 bits on a physical uplink channel.

BRIEF DESCRIPTION OF DRAWINGS

FIG. 8 is a table illustrating base sequences $M_{i,n}$ according to the present invention.

DESCRIPTION OF EMBODIMENTS

Hereinafter, an embodiment of the present invention will be described in detail hereinafter with reference to the drawings.

First, physical channels according to the present invention will be described.

Figure 1:
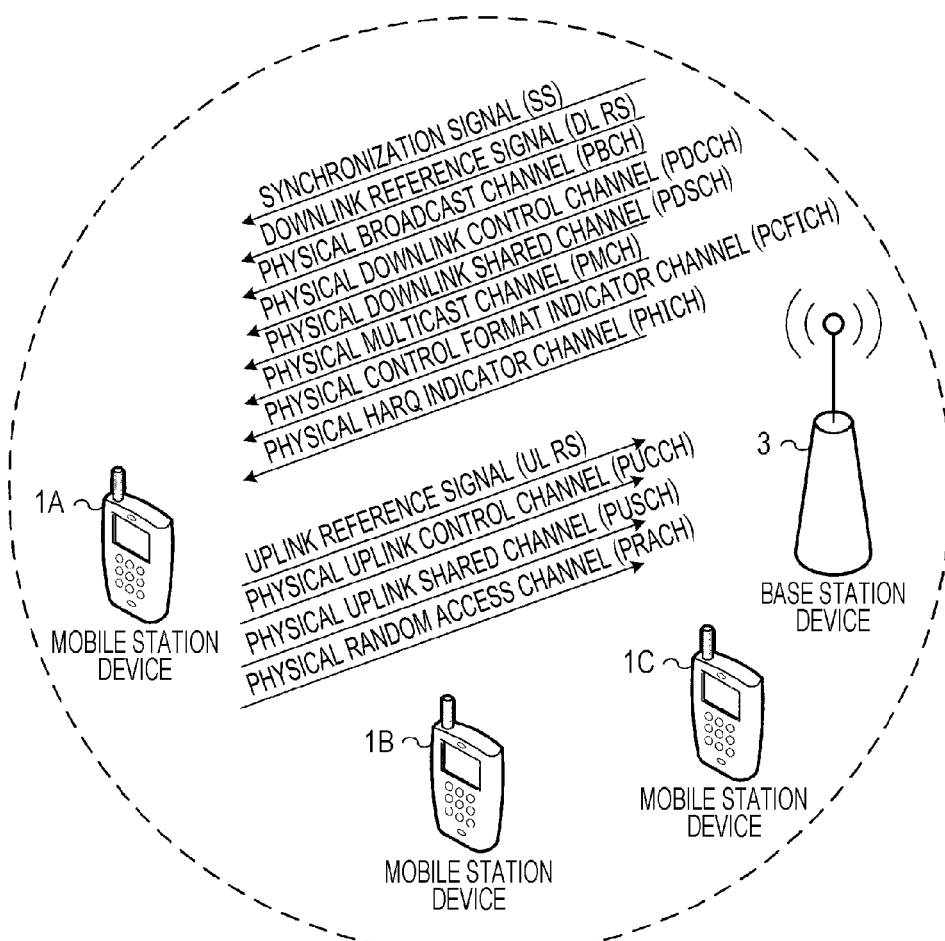
FIG. 1 is a conceptual diagram of a wireless communication system according to the present invention.

FIG. 1 is a conceptual diagram of a wireless communication system according to the present invention. In FIG. 1, the wireless communication system includes mobile station devices 1A to 1C and a base station device 3. FIG. 1 illustrates the allocation of a Synchronization Signal (SS), a Downlink Reference Signal (DL RS), a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH), and a Physical Hybrid ARQ Indicator Channel (PHICH) in wireless communication from the base station device 3 to the mobile station devices 1A to 1C (downlink).

FIG. 1 illustrates the allocation of an Uplink Reference Signal (UL RS), a Physical Uplink Control Channel (PUCCH), a Physical Uplink Shared Channel (PUSCH), and a Physical Random Access Channel (PRACH) in wireless communication from the mobile station devices 1A to 1C to the base station device 3 (uplink). The mobile station devices 1A to 1C are hereinafter referred to as the mobile station devices 1.

The synchronization signal is a signal used by each of the mobile station devices 1 to acquire frequency-domain and time-domain synchronization for downlink. The downlink reference signal is a signal used by each of the mobile station devices 1 to acquire frequency-domain and time-domain synchronization for downlink, used by each of the mobile station devices 1 to measure the quality of downlink reception, or used by each of the mobile station devices 1 to perform propagation path compensation for PDSCH or PDCCH.

The PBCH is a physical channel used to broadcast control parameters (system information) (Broadcast Channel: BCH) commonly used by the mobile station devices 1. The PBCH is transmitted every 40 ms. The 40 ms timing is blindly detected in the mobile station devices 1.

The PDCCH is a physical channel used to transmit Downlink Control Information (DCI) such as a downlink assignment (or also referred to as a downlink grant) and an uplink grant. The downlink assignment includes modulation scheme and coding rate information (Modulation and Coding Scheme: MCS) on the PDSCH, that is, downlink data, information indicating the allocation of radio resources, and so forth. An uplink grant includes modulation scheme and coding rate information on the PUSCH, that is, uplink data, information indicating the allocation of radio resources, and so forth.

The downlink control information uses a plurality of formats. The formats of the downlink control information are referred to as DCI formats. As the DCI formats of a downlink assignment, DCI format 1A, which is used when the base station device 3 transmits the PDSCH using a single transmit antenna port or transmit diversity, DCI format 2, which is used when the base station device 3 transmits a plurality of pieces of downlink data (Downlink Shared Channels: DL-SCHs) using MIMO SM (Multiple Input Multiple Output Spatial Multiplexing) for the PDSCH, and so forth are prepared.

As the DCI formats of an uplink grant, DCI format 0, which is used when each of the mobile station devices 1 transmits the PUSCH using a single transmit antenna port, DCI format 0A, which is used when a mobile station device transmits a plurality of pieces of uplink data (Uplink Shared Channels: UL-SCHs) using MIMO SM for the PUSCH, and so forth are prepared.

The MIMO SM is a technology in which a plurality of signals are multiplexed to channels of a plurality of spatial dimensions implemented by a plurality of transmit antenna ports and a plurality of receive antenna ports and are transmitted and received. The term antenna port, as used herein, refers to a logical antenna used for signal processing. One antenna port may include one physical antenna or include a plurality of physical antennas.

On a MIMO SM transmit side, a process (referred to as precoding) for forming an appropriate spatial channel is performed on a plurality of signals, and a plurality of signals on which the precoding process has been performed are transmitted using a plurality of transmit antennas. On a MIMO SM receive side, a process for appropriately separating a signal multiplexed by a channel of a spatial dimension is performed on a plurality of signals received using a plurality of receive antennas.

The base station device 3 transmits DCI format 0A including information indicating the number of pieces of uplink data to be transmitted on a PUSCH scheduled by the base station device 3, the number of regions (hereinafter called layers) space-multiplexed in the PUSCH, the layer to which the uplink data is mapped, and the type of precoding to be performed by each of the mobile station devices 1. The mobile station device 1 determines the number of pieces of uplink data to be transmitted on the PUSCH corresponding to the DCI format 0A, the number of layers space-multiplexed in the PUSCH, the layer to which the uplink data is mapped, and the type of precoding on the basis of the DCI format 0A received from the base station device 3.

The PDSCH is a physical channel used to transmit system information other than BCH, which is not broadcasted on the PBCH, or downlink data, or Paging Channel (PCH). The PMCH is a physical channel used to transmit a Multicast Channel (MCH), which is MBMS (Multimedia Broadcast and Multicast Service) information.

The PCFICH is a physical channel used to transmit information indicating the region to which the PDCCH is mapped. The PHICH is a physical channel used to transmit a HARQ indicator indicating success or failure of decoding of the uplink data received by the base station device 3.

If the base station device 3 has succeeded in decoding the uplink data included in the PUSCH, the HARQ indicator indicates ACK (ACKnowledgement). If the base station device 3 has failed in decoding the uplink data included in the PUSCH, the HARQ indicator indicates NACK (Negative ACKnowledgement). In the case of indicating success or failure of decoding for each of a plurality of pieces of uplink data included in the same PUSCH, a plurality of HARQ indicators are transmitted on a plurality of PHICHs.

The uplink reference signal is a signal used by the base station device 3 to acquire time-domain synchronization for uplink, used by the base station device 3 to measure the quality of uplink reception, or used by the base station device 3 to perform propagation path compensation for PUSCH or PUCCH. The uplink reference signal is code spread in radio resources divided for the assumption of SC-FDMA using a CAZAC (Constant Amplitude and Zero Auto-Correlation) sequence.

The CAZAC sequence is a sequence having a constant amplitude and excellent autocorrelation properties in the time domain and the frequency domain. Because the amplitude is constant in the time domain, the PAPR (Peak to Average Power Ratio) can be kept low. A cyclic delay is applied to the DMRS in the time domain. The cyclic delay applied in the time domain is referred to as a cyclic shift. The cyclic shift corresponds to a phase rotation of a CAZAC sequence on a subcarrier-by-subcarrier basis in the frequency domain.

Examples of the uplink reference signal include a DMRS (Demodulation Reference Signal) that is time-multiplexed with PUSCH or PUCCH and transmitted and that is used to perform propagation path compensation for PUSCH and PUCCH, and a SRS (Sounding Reference Signal) that is transmitted independently of PUSCH and PUCCH and that is used by the base station device 3 for uplink propagation path state estimation. Not only the cyclic shift but also the time domain spreading code (Orthogonal Cover Code: OCC) is used for the DMRS.

The PUCCH is a physical channel used to transmit Uplink Control Information (UCI), which is information used for communication control, such as Channel Quality Information indicating the quality of downlink channels, a Scheduling Request (SR) indicating a request for allocating uplink radio resources, and ACK/NACK (also referred to as HARQ-ACK) indicating success or failure of decoding of downlink data received by each of the mobile station devices 1.

Examples of the channel quality information include Channel Quality Indicator (CQI), Rank Indicator (RI), and Predocing Matrix Indicator (PMI). The CQI is information indicating channel quality, for modifying radio transmission parameters, such as an error correction scheme of physical channels for downlink, an error correction coding rate, and the level of data modulation.

The RI is information indicating the number (Rank) of units (streams) of signal sequences for downlink in which transmission signal sequences are pre-processed in advance, for which the each of the mobile station devices 1 makes a request to the base station device 3 when a plurality of pieces of downlink data are spatially multiplexed and transmitted using the MIMO SM scheme. The PMI is information on precoding for pre-processing transmission signal sequences in advance, for which each of the mobile station devices 1 makes a request to the base station device 3 for spatial multiplexing and transmission using the MIMO SM scheme.

The PUSCH is a physical channel used to transmit uplink data or uplink control information. If a mobile station device is not allocated radio resources for the PUSCH when transmitting uplink control information, the uplink control information is transmitted on the PUCCH. If a mobile station device is allocated radio resources for the PUSCH when transmitting uplink control information, the uplink control information is transmitted on the PUSCH. If radio resources for a plurality of PUSCHs are allocated, the uplink control information is transmitted on any one of the PUSCHs.

The PRACH is a physical channel used to transmit a random access preamble. The chief purpose of the PRACH is to allow each of the mobile station devices 1 to acquire time-domain synchronization with the base station device 3, and, additionally, the PRACH is used for initial access, handover, reconnection request, and request for allocating radio resources for uplink.

The uplink data (UL-SCH), the downlink data (DL-SCH), the multicast channel (MCH), the PCH, the BCH, and the like are transport channels. The unit of transmitting uplink data on the PUSCH and the unit of transmitting downlink data on the PDSCH are referred to as transport blocks. The transport block is a unit handled in the MAC (Media Access Control) layer, and HARQ (retransmission) control is performed for each transport block.

In the physical layer, each transport block is associated with a Cord Word (CW), and signal processing such as encoding is performed for each codeword. The transport block size represents the number of bits of the transport block (payload size). Each of the mobile station devices 1 identifies the transport block size from the number of Physical Resource Blocks (PRBs) indicated by information indicating the allocation of radio resources for the PUSCH or PDSCH and information associated with modulation scheme and coding rate (MCS or MCS&RV (Redundancy Version)) on the PUSCH or PDSCH, which are included in an uplink grant or downlink assignment.

Hereinafter, cell aggregation (carrier aggregation) according to the present invention will be described.

Figure 2:
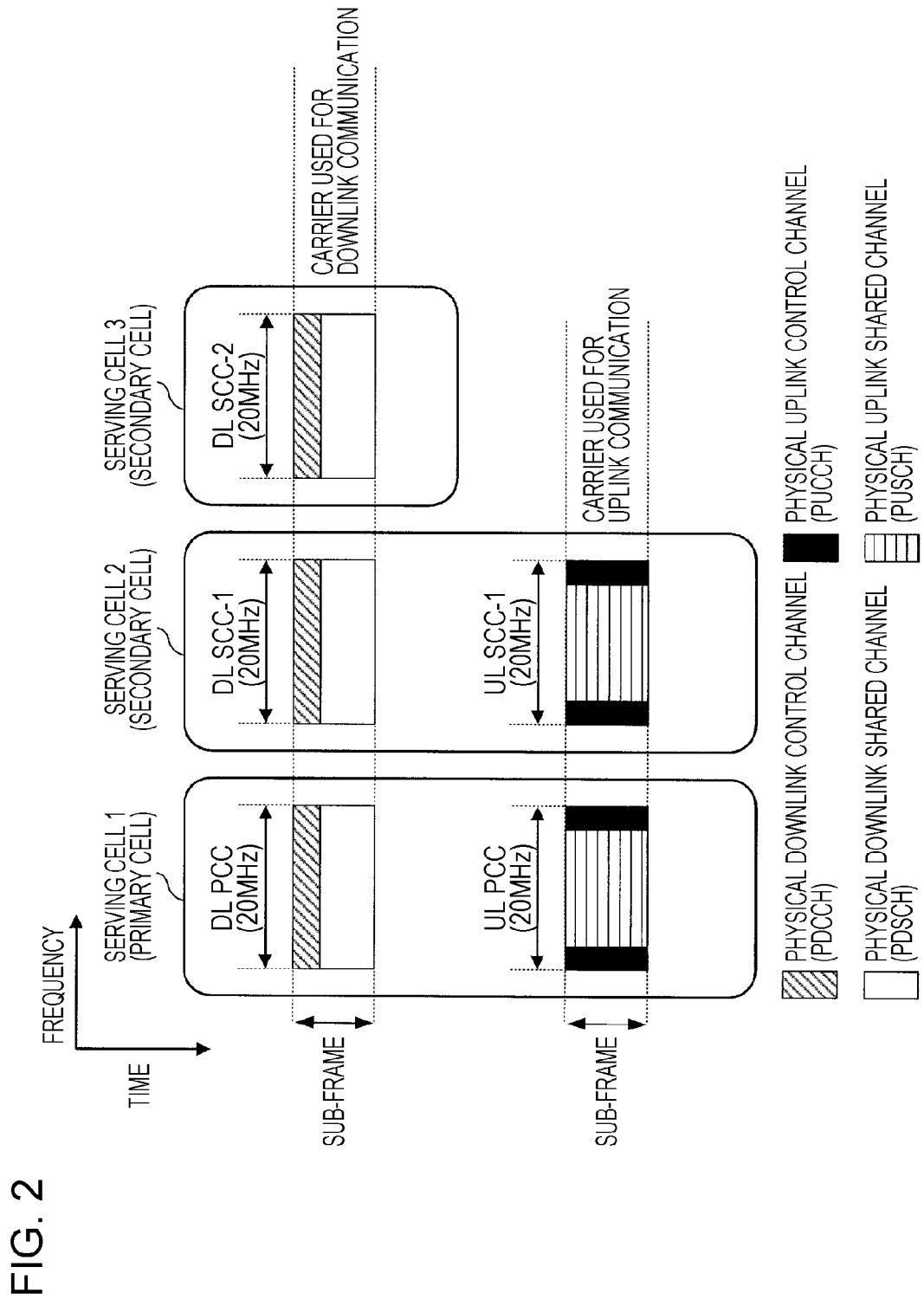
FIG. 2 is a diagram illustrating an example of a cell aggregation process according to the present invention.

FIG. 2 is a diagram illustrating an example of a cell aggregation process according to the present invention. In FIG. 2, the horizontal axis represents the frequency domain and the vertical axis represents the time domain. In the cell aggregation process illustrated in FIG. 2, three serving cells (serving cell 1, serving cell 2, serving cell 3) are aggregated. One of a plurality of serving cells to be aggregated is a Primary cell (Pcell). The primary cell is a serving cell having functions equivalent to those of a cell in LTE.

The serving cells other than the primary cell are Secondary cells (Scells). The secondary cells are cells having more restrictive functions than the primary cell, and are mainly used to transmit and receive PDSCH and/or PUSCH. For example, the mobile station devices 1 perform random access only on the primary cell. Further, the mobile station devices 1 may not necessarily receive paging and system information transmitted on the PBCH and PDSCH in the secondary cells.

The carriers corresponding to serving cells in the downlink are Downlink Component Carriers (DL CCs), and the carriers corresponding to serving cells in the uplink are Uplink Component Carriers (UL CCs). The carriers corresponding to the primary cell in the downlink are Downlink Primary Component Carriers (DL PCCs), and the carriers corresponding to the primary cell in the uplink are Uplink Primary Component Carriers (UL PCCs). The carriers corresponding to the secondary cells in the downlink are Downlink Secondary Component Carriers (DL SCCs), and the carriers corresponding to the secondary cells in the uplink are Uplink Secondary Component Carriers (UL SCCs).

The base station device 3 necessarily sets both the DL PCC and the UL PCC for the primary cell. The base station device 3 can further set only the DL SCC or both the DL SCC and the UL SCC for the secondary cells.

Further, the frequency or carrier frequency of a serving cell is called a serving frequency or serving carrier frequency. The frequency or carrier frequency of a primary cell is called a primary frequency or primary carrier frequency, and the frequency or carrier frequency of a secondary cell is called a secondary frequency or secondary carrier frequency.

Each of the mobile station devices 1 and the base station device 3 first start communication using a single serving cell. After communication is started, the base station device 3 sets a set of cells, including one primary cell and one or a plurality of secondary cells, in the mobile station device 1 using an RRC signal (Radio Resource Control signal).

In FIG. 2, the serving cell 1 is the primary cell, and the serving cell 2 and the serving cell 3 are the secondary cells. Both the DL PCC and UL PCC are set in the serving cell 1 (primary cell), and both the DL SCC-1 and UL SCC-2 are set in the serving cell 2 (secondary cell). Only the DL SCC-2 is set in the serving cell 3 (secondary cell).

The channels used for the DL CCs and UL CCs have the same channel structure as that in LTE. In FIG. 2, each of the DL CCs has a region to which the PHICH, the PCFICH, and the PDCCH are mapped, which is represented by a region hatched with oblique lines, and a region to which the PDSCH is mapped, which is represented by a region hatched with dots. The PHICH, the PCFICH, and the PDCCH are frequency-multiplexed and/or time-multiplexed. The region where the PHICH, the PCFICH, and the PDCCH are frequency-multiplexed and/or time-multiplexed and the region to which the PDSCH is mapped are time-multiplexed. In each of The UL CCs, the region to which the PUCCH represented by a gray region is mapped, and the region to which the PUSCH represented by a region hatched with horizontal lines is mapped are frequency-multiplexed.

In cell aggregation, up to one PDSCH can be transmitted using one serving cell (DL CC), and up to one PUSCH can be transmitted using one serving cell (UL CC). In FIG. 2, up to three PDSCHs can be simultaneously transmitted using three DL CCs, and up to two PUSCHs can be simultaneously transmitted using two UL CCs.

In cell aggregation, furthermore, a downlink assignment including information indicating the allocation of radio resources for the PDSCH in the primary cell, and an uplink grant including information indicating the allocation of radio resources for the PUSCH in the primary cell are transmitted on the PDCCHs in the primary cell. A single serving cell in which a downlink assignment including information indicating the allocation of radio resources for the PDSCH in the secondary cell and an uplink grant including information indicating the allocation of radio resources for the PUSCH in the secondary cell are transmitted on the PDCCH is set by the base station device 3. This setting may differ from one mobile station device 1 to another.

If a setting is made so that a downlink assignment including information indicating the allocation of radio resources for the PDSCH and an uplink grant including information indicating the allocation of radio resources for the PUSCH in a certain secondary cell are transmitted in different serving cells, each of the mobile station devices 1 does not decode the PDCCH in this secondary cell. For example, in FIG. 2, if a setting is made so that a downlink assignment including information indicating the allocation of radio resources for the PDSCH and an uplink grant including information indicating the allocation of radio resources for the PUSCH in the serving cell 2 are transmitted in the serving cell 1, and a downlink assignment including information indicating the allocation of radio resources for the PDSCH and an uplink grant including information indicating the allocation of radio resources for the PUSCH in the serving cell 3 are transmitted in the serving cell 3, the mobile station devices 1 decode the PDCCH in the serving cell 1 and the serving cell 3, but do not decode the PDCCH in the serving cell 2.

The base station device 3 sets, for each serving cell, whether or not a downlink assignment and an uplink grant include a Carrier Indicator that is information indicating the serving cell to which the downlink assignment and the uplink grant allocate the radio resources for the PDSCH or PUSCH. The PHICH is transmitted in the serving cell in which the uplink grant that includes information indicating the allocation of radio resource for the PUSCH for which the PHICH indicates ACK/NACK has been transmitted.

In an FDD (Frequency Division Duplex) wireless communication system, a DL CC and a UL CC corresponding to a single serving cell are constructed at different frequencies. In a TDD (Time Division Duplex) wireless communication system, a DL CC and a UL CC corresponding to a single serving cell are constructed at the same frequency, and an uplink sub-frame and a downlink sub-frame are time-multiplexed at the serving frequency.

Figure 3:
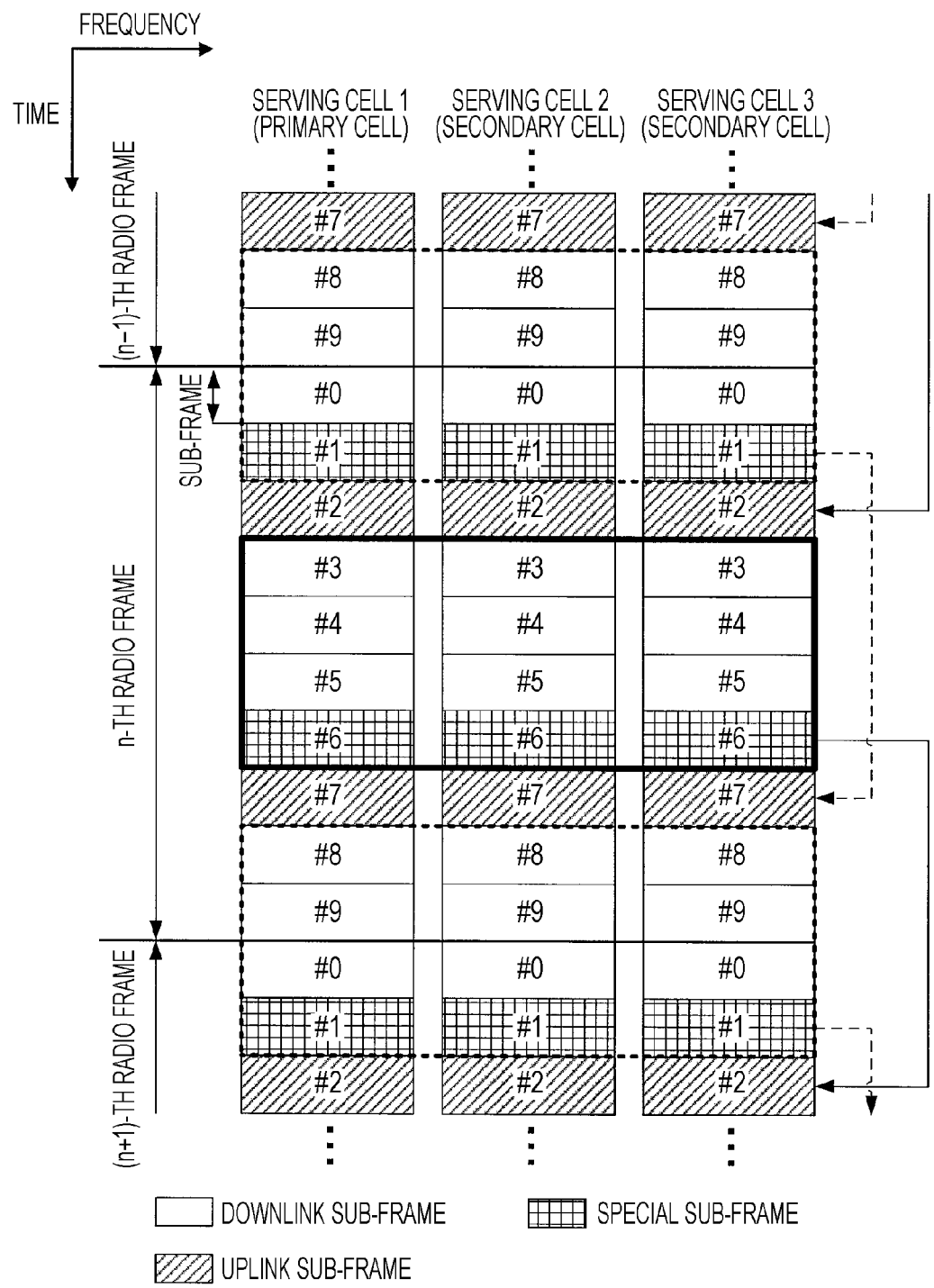
FIG. 3 is a diagram illustrating an example of the radio frame configuration of a TDD wireless communication system according to the present invention.

FIG. 3 is a diagram illustrating an example of the radio frame configuration of radio frames in a TDD wireless communication system according to the present invention. In FIG. 3, the horizontal axis represents the frequency domain and the vertical axis represents the time domain. In FIG. 3, a white rectangle represents a downlink sub-frame, a rectangle hatched with oblique lines represents a downlink sub-frame, and a rectangle hatched with dots represents a special sub-frame. A number (#i) assigned to a sub-frame denotes the number of the sub-frame in the radio frames.

In the downlink sub-frames, downlink signals such as PDCCH and PDSCH are transmitted. In the uplink sub-frames, uplink signals such as PUCCH and PUSCH are transmitted. Each special sub-frame includes three fields, DwPTS (Downlink Pilot Time Slot), GP (Guard Period), and UpPTS (Uplink Pilot Time Slot). The DwPTS, the GP, and the UpPTS are time-multiplexed. The DwPTS is a field in which downlink signals such as PDCCH and PDSCH are transmitted. The UpPTS is a field in which SRS and/or PRACH is transmitted. In the UpPTS, PUCCH and PUSCH are not transmitted. The GP is a period during which the mobile station devices 1 and the base station device 3 switch between uplink transmission and reception and downlink transmission and reception.

All the serving cells subjected to cell aggregation have the same sub-frame pattern. That is, at a certain timing, each of the mobile station devices 1 and the base station device 3 perform wireless communication using sub-frames of the same kind in all the serving cells subjected to cell aggregation. In FIG. 3, a plurality of ACKs/NACKs for downlink data received by each of the mobile station devices 1 on the PDSCHs in the sub-frames #8, the sub-frames #9, the sub-frames #0, and the sub-frames #1 (the sub-frames surrounded by thick dotted lines in FIG. 3) in the serving cell 1 to the serving cell 3 are transmitted on the PUCCH or PUSCH in the sub-frame #7, which is six sub-frames after the sub-frame #1. Further, a plurality of ACKs/NACKs for downlink data received by each of the mobile station devices 1 on the PDSCHs in the sub-frames #3 to the sub-frames #6 (the sub-frames surrounded by thick solid line in FIG. 3) in the serving cell 1 to the serving cell 3 are transmitted on the PUCCH or PUSCH in the sub-frame #2, which is six sub-frames after the sub-frame #6.

Hereinafter, the configuration of each sub-frame according to the present invention will be described.

Figure 4:
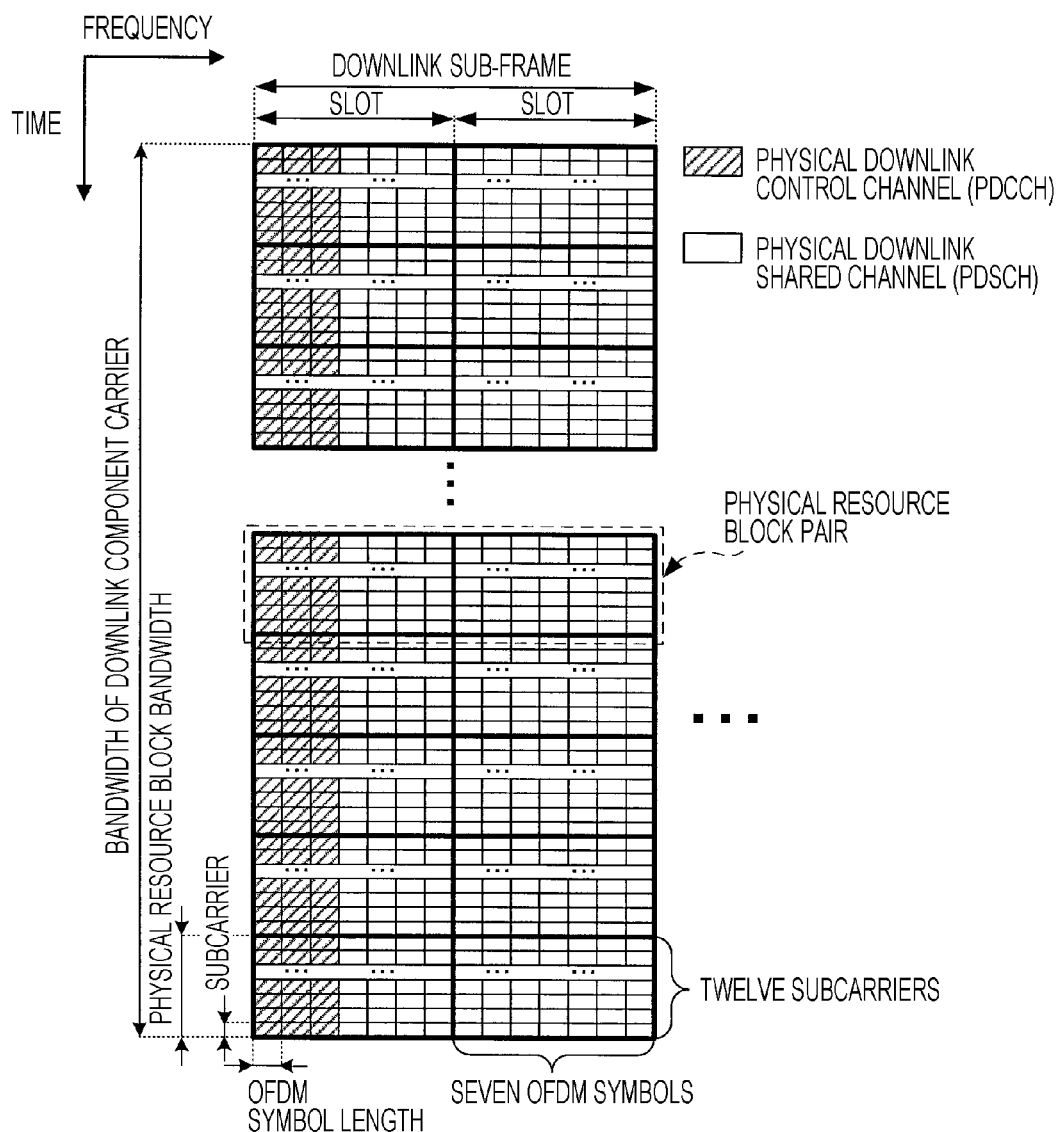
FIG. 4 is a schematic diagram illustrating an example of the configuration of a downlink sub-frame according to the present invention.

FIG. 4 is a schematic diagram illustrating an example of the configuration of a downlink sub-frame according to the present invention. In FIG. 4, the vertical axis represents the time domain and the horizontal axis represents the frequency domain. As illustrated in FIG. 4, a DL CC sub-frame includes a plurality of downlink Physical Resource Block (PRB) pairs (for example, a region surrounded by the broken line in FIG. 4). Each of the downlink physical resource block pairs is the unit of allocation of radio resources or the like, and has a frequency band of a predetermined width (PRB bandwidth; 180 kHz) and a time zone (two slots=one sub-frame; 1 ms).

One downlink physical resource block pair includes two downlink physical resource blocks (PRB bandwidth×slot) consecutive in the time domain. One downlink physical resource block (the unit surrounded by a thick line in FIG. 4) includes twelve subcarriers (15 kHz) in the frequency domain, and includes seven OFDM (Orthogonal Frequency Division Multiplexing) symbols (71 μs) in the time domain.

In the time domain, one sub-frame (1 ms) includes two slots (0.5 ms). Further, one slot includes seven OFDM symbols (approximately 71 μs). A time interval of 1 ms, which is the same time interval as a sub-frame, is also referred to as a Transmit Time Interval (TTI). In the frequency domain, a plurality of downlink physical resource blocks are mapped in accordance with the bandwidth of each DL CC. A unit including one subcarrier and one OFDM symbol is referred to as a downlink resource element.

Hereinafter, mapping of physical channels allocated for downlink will be described. The PDCCH, the PCFICH, the PHICH, the PDSCH, the downlink reference signal, and so forth are mapped to each downlink sub-frame. The PDCCH is mapped to OFDM symbols, starting from the OFDM symbol at the beginning of the sub-frame (region hatched with right-up oblique lines in FIG. 3). The number of OFDM symbols to which the PDCCH is mapped depends on each sub-frame, and information indicating the number of OFDM symbols to which the PDCCH is mapped is broadcasted on the PCFICH transmitted in the first OFDM symbol in the sub-frame. In each sub-frame, a plurality of PDCCHs are frequency-multiplexed and time-multiplexed.

The PCFICH is mapped to the OFDM symbol at the beginning of the sub-frame, and is frequency-multiplexed with the PDCCH. The PHICH is frequency-multiplexed in the same OFDM symbol as the PDCCH. In each sub-frame, a plurality of PHICHs are frequency-multiplexed and code-multiplexed. Each of the mobile station devices 1 receives an ACK/NACK on a PHICH in a downlink sub-frame after a certain amount of time has elapsed since a PUSCH was transmitted (for example, after 4 ms, after four sub-frames, after 4 TTI), for uplink data transmitted on the PUSCH.

The PDSCH is mapped to OFDM symbols (regions not hatched in FIG. 4) other than the OFDM symbols to which the PDCCH, the PCFICH, and the PHICH are mapped in the sub-frame. The allocation of radio resources for the PDSCH is presented to the mobile station devices 1 using downlink assignments. The radio resources for the PDSCH are mapped to the same downlink sub-frame as that for the PDCCH, which includes the downlink assignment indicating the allocation of the PDSCH in the time domain.

The PDSCH and the PDCCH corresponding to the PDSCH are mapped to the same serving cell or different serving cells. In a sub-frame for each downlink component carrier, a plurality of PDSCHs are frequency-multiplexed and space-multiplexed. Although not illustrated in FIG. 4 for simplicity of illustration, downlink reference signals are distributed and mapped in the frequency domain and the time domain.

Figure 5:
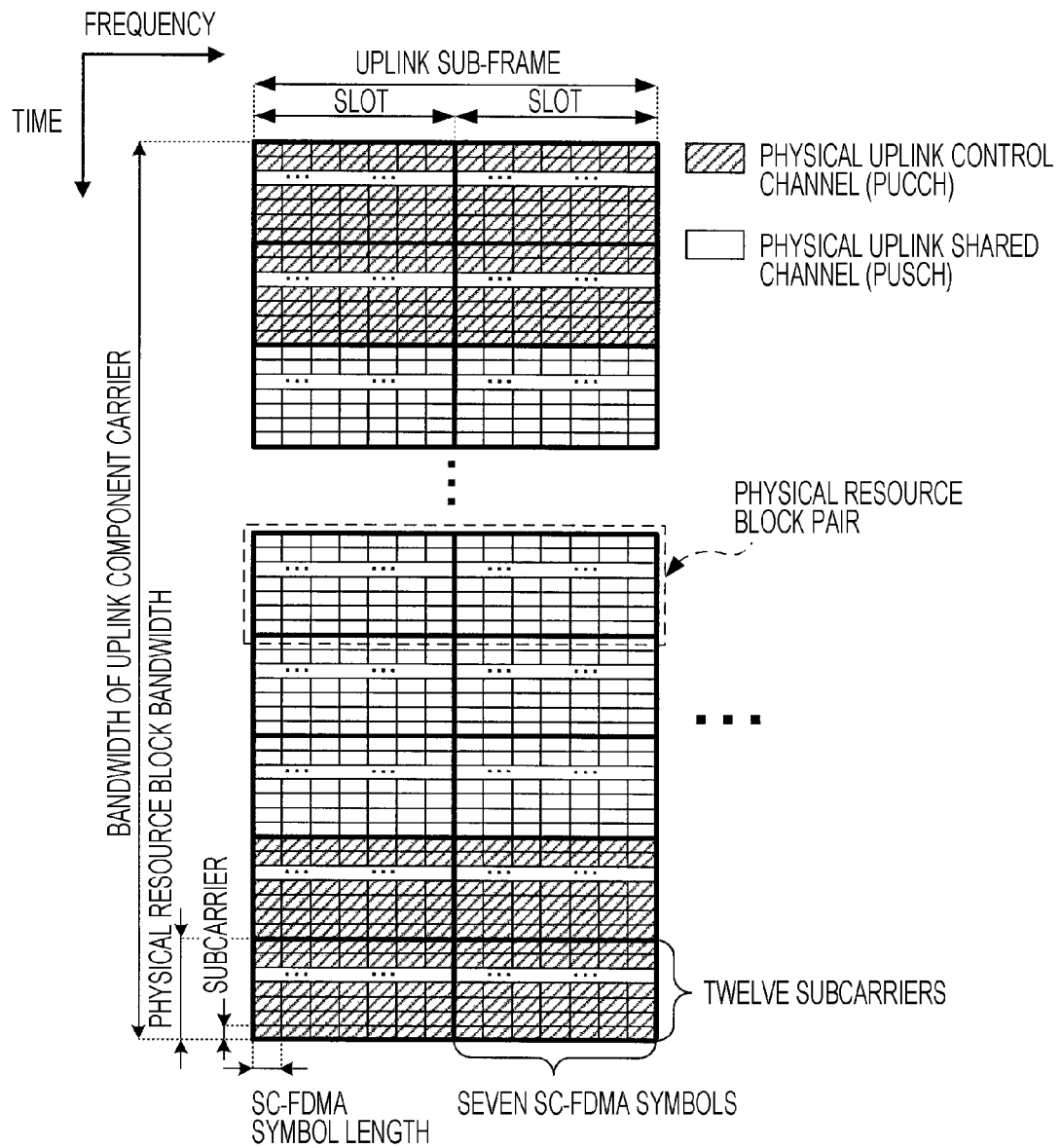
FIG. 5 is a schematic diagram illustrating an example of the configuration of an uplink sub-frame according to the present invention.

FIG. 5 is a schematic diagram illustrating an example of the configuration of an uplink sub-frame according to the present invention. In FIG. 5, the vertical axis represents the time domain and the horizontal axis represents the frequency domain. As illustrated in FIG. 5, a UL CC sub-frame includes a plurality of uplink physical resource block pairs (for example, a region surrounded by the broken line in FIG. 5). Each of the uplink physical resource block pairs is the unit of allocation of radio resources or the like, and has a frequency band of a predetermined width (PRB bandwidth; 180 kHz) and a time zone (two slots=one sub-frame; 1 ms).

One uplink physical resource block pair includes two uplink physical resource blocks (PRB bandwidth×slot) consecutive in the time domain. One uplink physical resource block (the unit surrounded by a thick line in FIG. 5) includes twelve subcarriers in the frequency domain, and includes seven SC-FDMA (Single-Carrier Frequency Division Multiple Access) symbols (71 μs) in the time domain.

In the time domain, one sub-frame (1 ms) includes two slots (0.5 ms). Further, one slot includes seven SC-FDMA symbols (time symbols) (approximately 71 μs). A time interval of 1 ms, which is the same time interval as a sub-frame, is also referred to as a Transmit Time Interval (TTI). In the frequency domain, a plurality of uplink physical resource blocks are mapped in accordance with the bandwidth of each UL CC. A unit including one subcarrier and one SC-FDMA symbol is referred to as an uplink resource element.

Hereinafter, physical channels allocated in radio frames for uplink will be described. The PUCCH, the PUSCH, the PRACH, the uplink reference signal, and so forth are mapped to each uplink sub-frame. The PUCCH is mapped to uplink physical resource blocks (regions hatched with right-up oblique lines) located at both ends of a band for the uplink. In each sub-frame, a plurality of PUCCHs are frequency-multiplexed and code-multiplexed.

The PUSCH is mapped to uplink physical resource block pairs (regions not hatched) other than the uplink physical resource blocks to which the PUCCH is mapped. The radio resources on the PUSCH are allocated using an uplink grant, and are mapped to uplink sub-frames after a certain amount of time has elapsed since a downlink sub-frame to which the PDCCH including the uplink grant is mapped (for example, after 4 ms, after four sub-frames, after 4 TTI). In each sub-frame, a plurality of PUSCHs are frequency multiplex and space-multiplexed.

Information indicating the sub-frames and uplink physical resource blocks on which the PRACH is mapped is broadcasted by a base station device. The uplink reference signal is time-multiplexed with the PUSCH and PUCCH and is then transmitted. In a case where the PUSCH and the uplink reference signal are time-multiplexed, the uplink reference signal is mapped to the same frequency band as that to which the PUSCH is allocated in the frequency domain, and is mapped to the fourth and eleventh SC-FDMA symbols in the time domain. In a case where the PUCCH and the uplink reference signal are time-multiplexed, the uplink reference signal is mapped to the same frequency band as that to which the PUCCH is allocated in the frequency domain, and is mapped to the second, fifth, ninth, and thirteenth SC-FDMA symbols in the time domain.

Hereinafter, the device configuration of each of the mobile station devices 1 according to the present invention will be described.

Figure 6:
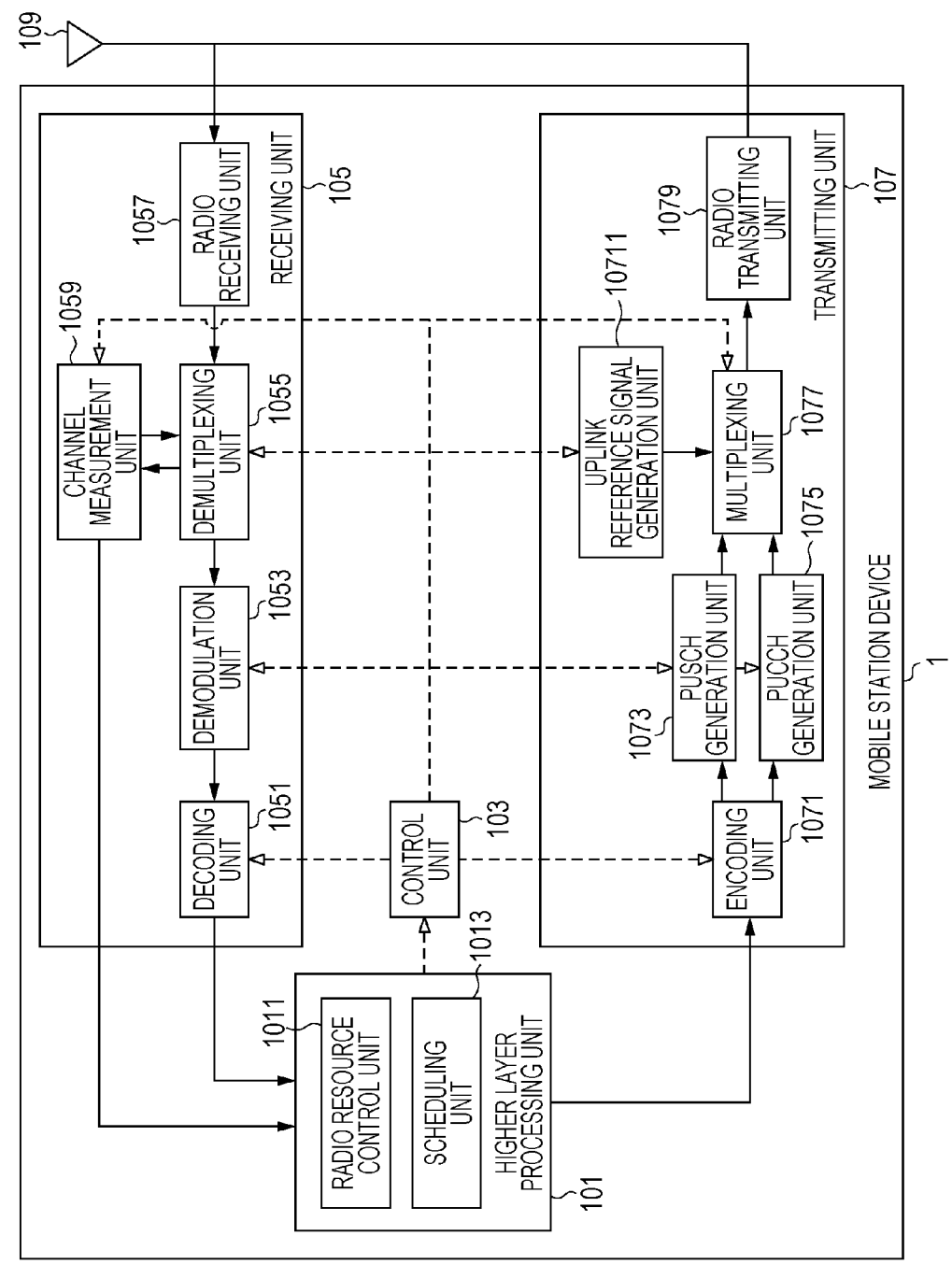
FIG. 6 is a schematic block diagram illustrating the configuration of a mobile station device 1 according to the present invention.

FIG. 6 is a schematic block diagram illustrating the configuration of each of the mobile station devices 1 according to the present invention. As illustrated in the drawings, the mobile station device 1 includes a higher layer processing unit 101, a control unit 103, a receiving unit 105, a transmitting unit 107, and a transmit/receive antenna 109. The higher layer processing unit 101 includes a radio resource control unit 1011 and a scheduling unit 1013. The receiving unit 105 includes a decoding unit 1051, a demodulation unit 1053, a demultiplexing unit 1055, a radio receiving unit 1057, and a channel measurement unit 1059. The transmitting unit 107 includes an encoding unit 1071, a PUSCH generation unit 1073, a PUCCH generation unit 1075, a multiplexing unit 1077, a radio transmitting unit 1079, and an uplink reference signal generation unit 10711.

The higher layer processing unit 101 outputs uplink data generated by user operation or the like to the transmitting unit 107. Further, the higher layer processing unit 101 performs the processing of the Medium Access Control (MAC) layer, the Packet Data Convergence Protocol (PDCP) layer, the Radio Link Control (RLC) layer, and the Radio Resource Control (RRC) layer. Further, the higher layer processing unit 101 generates control information for controlling the receiving unit 105 and the transmitting unit 107, based on downlink control information received on the PDCCH and the like, and outputs the control information to the control unit 103.

The radio resource control unit 1011 included in the higher layer processing unit 101 manages various kinds of setting information on the own device. For example, the radio resource control unit 1011 manages set serving cells. Further, the radio resource control unit 1011 generates information to be mapped to each uplink channel, and outputs the information to the transmitting unit 107. If the decoding of the received uplink data is successful, the radio resource control unit 1011 generates an ACK and outputs the ACK to the transmitting unit 107. If the decoding of the received uplink data has failed, the radio resource control unit 1011 generates a NACK and outputs the NACK to the transmitting unit 107.

The scheduling unit 1013 included in the higher layer processing unit 101 stores downlink control information received through the receiving unit 105. The scheduling unit 1013 controls the transmitting unit 107 through the control unit 103 to transmit a PUSCH, in accordance with the received uplink grant, in the sub-frame which is four sub-frames after the sub-frame in which the uplink grant has been received. The scheduling unit 1013 controls the transmitting unit 107 through the control unit 103 to retransmit a PUSCH, in accordance with the uplink grant stored in the scheduling unit 1013, in the sub-frame that is four sub-frames after the sub-frame in which a HARQ indicator indicating NACK has been received. The scheduling unit 1013 controls the receiving unit 105 through the control unit 103 to receive a PDSCH, in accordance with the received downlink assignment, in the sub-frame in which the downlink assignment has been received.

The control unit 103 generates a control signal for controlling the receiving unit 105 and the transmitting unit 107, based on control information from the higher layer processing unit 101. The control unit 103 outputs the generated control signal to the receiving unit 105 and the transmitting unit 107, and controls the receiving unit 105 and the transmitting unit 107.

The receiving unit 105 separates, demodulates, and decodes a reception signal received from the base station device 3 through the transmit/receive antenna 109 in accordance with a control signal input from the control unit 103, and outputs the decoded information to the higher layer processing unit 101.

The radio receiving unit 1057 converts (down coverts) a downlink signal received through the transmit/receive antenna 109 into an intermediate-frequency signal, removes the unnecessary frequency components, controls the amplification level so that the signal level can be appropriately maintained, orthogonally demodulates the received signal on the basis of its in-phase component and quadrature component, and converts the orthogonally demodulated analog signal into a digital signal. The radio receiving unit 1057 removes a portion corresponding to the Guard Interval (GI) from the converted digital signal, performs a Fast Fourier Transform (FFT) on the signal from which the guard interval has been removed, and extracts a signal in the frequency domain.

The demultiplexing unit 1055 separates the extracted signal into the PHICH, the PDCCH, the PDSCH, and the downlink reference signal. This separation is based on radio resource allocation information and the like reported using a downlink assignment. Further, the demultiplexing unit 1055 performs propagation path compensation for the PHICH, the PDCCH, and the PDSCH using the estimated values of the propagation paths input from the channel measurement unit 1059. Further, the demultiplexing unit 1055 outputs the separated downlink reference signal to the channel measurement unit 1059.

The demodulation unit 1053 multiplies the PHICH by the corresponding code to combine them, demodulates the combined signal using the BPSK (Binary Phase Shift Keying) modulation scheme, and outputs the result to the decoding unit 1051. The decoding unit 1051 decodes the PHICH addressed to the own device, and outputs the HARQ indicator obtained as a result of decoding to the higher layer processing unit 101. The demodulation unit 1053 demodulates the PDCCH using the QPSK (Quadrature Phase Shift Keying) modulation scheme, and outputs the result to the decoding unit 1051. The decoding unit 1051 attempts to blindly decode the PDCCH, and, if the blind decoding is successful, outputs the decoded downlink control information and RNTI included in the downlink control information to the higher layer processing unit 101. The demodulation unit 1053 demodulates the PDSCH using the modulation scheme reported using the downlink assignment, such as QPSK, 16QAM (Quadrature Amplitude Modulation), or 64QAM, and outputs the result to the decoding unit 1051.

The decoding unit 1051 performs decoding based on coding rate information reported using the downlink control information, and outputs the decoded downlink data to the higher layer processing unit 101. The channel measurement unit 1059 measures the downlink path loss or channel state from the downlink reference signal input from the demultiplexing unit 1055, and outputs the measured path loss or channel state to the higher layer processing unit 101. Further, the channel measurement unit 1059 calculates the estimated values of propagation paths for the downlink from the downlink reference signal, and outputs the results to the demultiplexing unit 1055.

The transmitting unit 107 generates an uplink reference signal in accordance with the control signal input from the control unit 103, encodes and modulates the uplink data or uplink control information input from the higher layer processing unit 101, multiplexes the PUCCH, the PUSCH, and the generated uplink reference signal, and transmits the result to the base station device 3 via the transmit/receive antenna 109.

Figure 7:
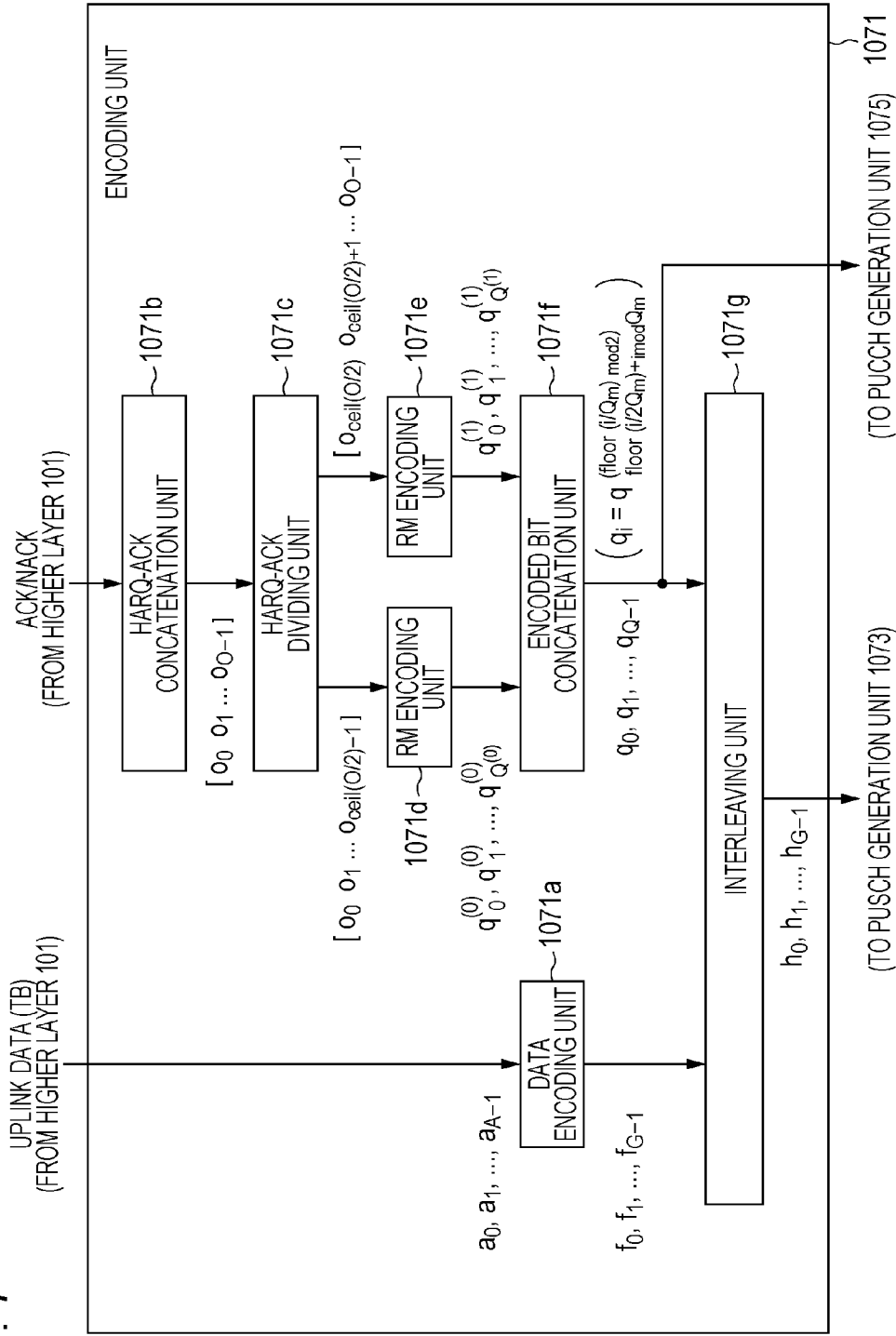
FIG. 7 is a schematic block diagram illustrating the configuration of an encoding unit 1071 according to the present invention.

The encoding unit 1071 encodes the uplink control information and uplink data input from the higher layer processing unit 101, and outputs the encoded bits to the PUSCH generation unit and/or the PUCCH generation unit. FIG. 7 is a schematic block diagram illustrating the configuration of the encoding unit 1071 according to the present invention. The encoding unit 1071 includes a data encoding unit 1071a, a HARQ-ACK concatenation unit 1071b, a HARQ-ACK dividing unit 1071c, an RM encoding unit 1071d, an RM encoding unit 1071e, an encoded bit concatenation unit 1071f, and an interleaving unit 1071g.

The data encoding unit 1071a encodes the uplink data $a_i$ input from the higher layer 101 on the basis of the uplink grant received from the base station device 3, and outputs encoded bits $f_i$ of the uplink data to the interleaving unit. A denotes the payload size (the number of bits) of the uplink data. G denotes the number of encoded bits of the uplink data. The HARQ-ACK concatenation unit 1071b concatenates a plurality of ACKs/NACKs input from the higher layer 101, and outputs the concatenated ACKs/NACKs $[o_0 o_1 \ldots o_{O-1}]$ to the HARQ-ACK concatenation unit 1071c. O denotes the number of bits of the ACK/NACK input from the higher layer 101, that is, the number of bits of the ACK/NACK transmitted in a certain sub-frame. In the present invention, the HARQ-ACK concatenation unit 1071b concatenates only ACKs/NACKs. When transmitting ACK/NACK, CQI/PMI/RI, and SR on the PUCCH, the HARQ-ACK concatenation unit 1071b may concatenate the ACK/NACK, the CQI/PMI/RI, and the SR.

The HARQ-ACK dividing unit 1071c divides the input ACKs/NACKs $[o_0 o_1 \ldots o_{O-1}]$ into a first ACK/NACK segment $[o_0 o_1 \ldots o_{ceil(O/2)-1}]$ and a second ACK/NACK segment $[o_{ceil(O/2)} o_{ceil(O/2)+1} \ldots o_{O-1}]$, and outputs the first ACK/NACK segment to the RM (Reed-Muller) encoding unit 1071d and the second ACK/NACK segment to the RM encoding unit 1071e. The payload size (the number of bits) $O^{(0)}$ of the first ACK/NACK segment is represented by expression (1). The payload size (the number of bits) $O^{(1)}$ of the second ACK/NACK is represented by expression (2). ceil(•) denotes a function that rounds the number in parentheses up.

[Math. 1]

$$O^{(0)} = ceil(O/2) \quad (1)$$

[Math. 2]

$$O^{(1)} = O - ceil(O/2) \quad (2)$$

The RM encoding unit 1071d RM-encodes the input first ACK/NACK segment in accordance with expression (3), and outputs the encoded bits $q^{(0)}_i$ of the first ACK/NACK segment to the encoded bit concatenation unit 1071f. The RM encoding unit 1071e RM-encodes the input second ACK/NACK segment in accordance with expression (4), and outputs the encoded bits $q^{(1)}_i$ of the second ACK/NACK segment to the encoded bit concatenation unit 1071f.

[Math. 3]

$$q^{(0)}_i = \sum_{n=0}^{O^{(0)}-1} (o_n \cdot M_{(i \bmod 32),n}) \bmod 2 \quad (3)$$

$$(i = 0, 1, \ldots, Q^{(0)} - 1)$$

[Math. 4]

$$q^{(1)}_i = \sum_{n=0}^{O^{(1)}-1} (o_{n+O^{(0)}} \cdot M_{(i \bmod 32),n}) \bmod 2 \quad (4)$$

$$(i = 0, 1, \ldots, Q^{(1)} - 1)$$

In expressions (3) and (4), $M_{i,n}$ denotes the base sequence of Reed-Muller codes. FIG. 8 is a table illustrating base sequences $M_{i,n}$ according to the present invention. $Q^{(0)}$ denotes the number of encoded bits of the first ACK/NACK segment. $Q^{(1)}$ denotes the number of encoded bits of the first ACK/NACK segment. In a case where ACKs/NACKs are transmitted on the PUCCH, $Q^{(0)}$ and $Q^{(1)}$ are set to 24. In a case where ACKs/NACKs are transmitted on the PUSCH, $Q^{(0)}$ and $Q^{(1)}$ are calculated using expressions (5) and (6). That is, in a case where ACKs/NACKs are transmitted on the PUSCH, the mobile station device 1 separately calculates the number of encoded bits of the first ACK/NACK and the number of encoded bits of the second ACK/NACK. In a case where ACKs/NACKs are transmitted on the PUCCH, $Q^{(0)}$ and $Q^{(1)}$ are set to a predetermined value. Thus, the number of radio resources to be used for the transmission of the first ACK/NACK segment and the second ACK/NACK segment and the numbers of encoded bits of the first ACK/NACK segment and the second ACK/NACK segment can be appropriately controlled in accordance with the payload sizes (the numbers of bits) of the first ACK/NACK segment and the second ACK/NACK segment.

Note that the base station device 3 also calculates the numbers of encoded bits of the first ACK/NACK segment and the second ACK/NACK segment and the numbers of modulation symbols corresponding to the first ACK/NACK segment and the second ACK/NACK segment using expressions (5) and (6), and separates the modulation symbols of the ACK/NACK and the modulation symbols of data on the basis of the calculation results.

[Math. 5]

$$Q^{(i)} = Q^{(i)}_m \times Q'^{(i)} (i = 0, 1) \quad (5)$$

[Math. 6]

$$Q'^{(i)} = \min\left(ceil\left(\frac{O^{(i)} \cdot M_{SC}^{PUSCH-initial} \cdot N_{symb}^{PUSCH-initial} \cdot \beta_{offset}^{PUSCH}}{B_1 + B_2}\right), 4 \times M_{SC}^{PUSCH}\right) \quad (6)$$

$$(i = 0, 1)$$

In a case where ACKs/NACKs are transmitted on the PUSCH, $Q^{(i)}_m$ denotes the modulation order for the modulation scheme of the uplink data transmitted together with the ACKs/NACKs on the PUSCH. In a case where ACKs/NACKs are transmitted on the PUCCH, $Q^{(i)}_m$ denotes the modulation order for the QPSK modulation scheme corresponding to the ACKs/NACKs transmitted on the PUCCH. The modulation order for the QPSK modulation scheme is 2. The modulation order for 16QAM is 4. The modulation order for 64QAM is 6.

min(•) denotes a function that selects the smallest number in parentheses. $M^{PUSCH-initial}_{SC}$ denotes the bandwidth scheduled for the PUSCH initial transmission of uplink data to be transmitted together with the ACKs/NACKs on the PUSCH, and is expressed in the number of subcarriers.

$N^{PUSCH\text{-}initial}{}_{symb}$ denotes the number of SC-FDMA symbols in a sub-frame used for the PUSCH initial transmission of uplink data to be transmitted together with the ACKs/NACKs on the PUSCH. $\beta^{PUSCH}{}_{offset}$ is an offset value that is set for each of the mobile station devices 1 by the base station device 3 and that is reported from the base station device 3 to the mobile station device 1 using a Radio Resource Control signal (RRC signal) or the like. $B_{(k)}$ denotes the sum of the payload size $A^{(k)}$ of the CW k and the sequence length of cyclic redundancy check codes loaded to the CW k. $M^{PUSCH}{}_{SC}$ denotes the bandwidth scheduled for the PUSCH transmission in the current sub-frame used for uplink data to be transmitted together with the ACKs/NACKs on the PUSCH, and is expressed in the number of subcarriers.

The encoded bit concatenation unit 1071f concatenates the encoded bits $q^{(0)}{}_i$ of the first ACK/NACK segment input from the RM encoding unit 1071d and the encoded bits $q^{(1)}{}_i$ of the second ACK/NACK segment input from the RM encoding unit 1071e. When transmitting ACKs/NACKs on the PUSCH, the encoded bit concatenation unit 1071f outputs the concatenated encoded bits $q_i$ of the ACK/NACK to the interleaving unit 1071g. When transmitting ACKs/NACKs on the PUCCH, the encoded bit concatenation unit 1071f outputs the concatenated encoded bits $q_i$ of the ACK/NACK to the PUCCH generation unit 1075.

The encoded bit concatenation unit 1071f concatenates the encoded bits $q^{(0)}{}_i$ of the first ACK/NACK segment and the encoded bits $q^{(1)}{}_i$ of the second ACK/NACK segment in accordance with expression (7). floor(•) denotes a function that rounds the number in parentheses down. Q denotes the number of concatenated encoded bits $q_i$ of the ACK/NACK, and denotes the sum of $Q^{(0)}$ and $Q^{(1)}$.

[Math. 7]

$$q_i = q_{floor(i/2Q_m)+i \bmod Q_m}{}^{(floor(i/Q_m)\bmod 2)} \ (i=0,1,\ldots,Q) \quad (7)$$

Figure 9:
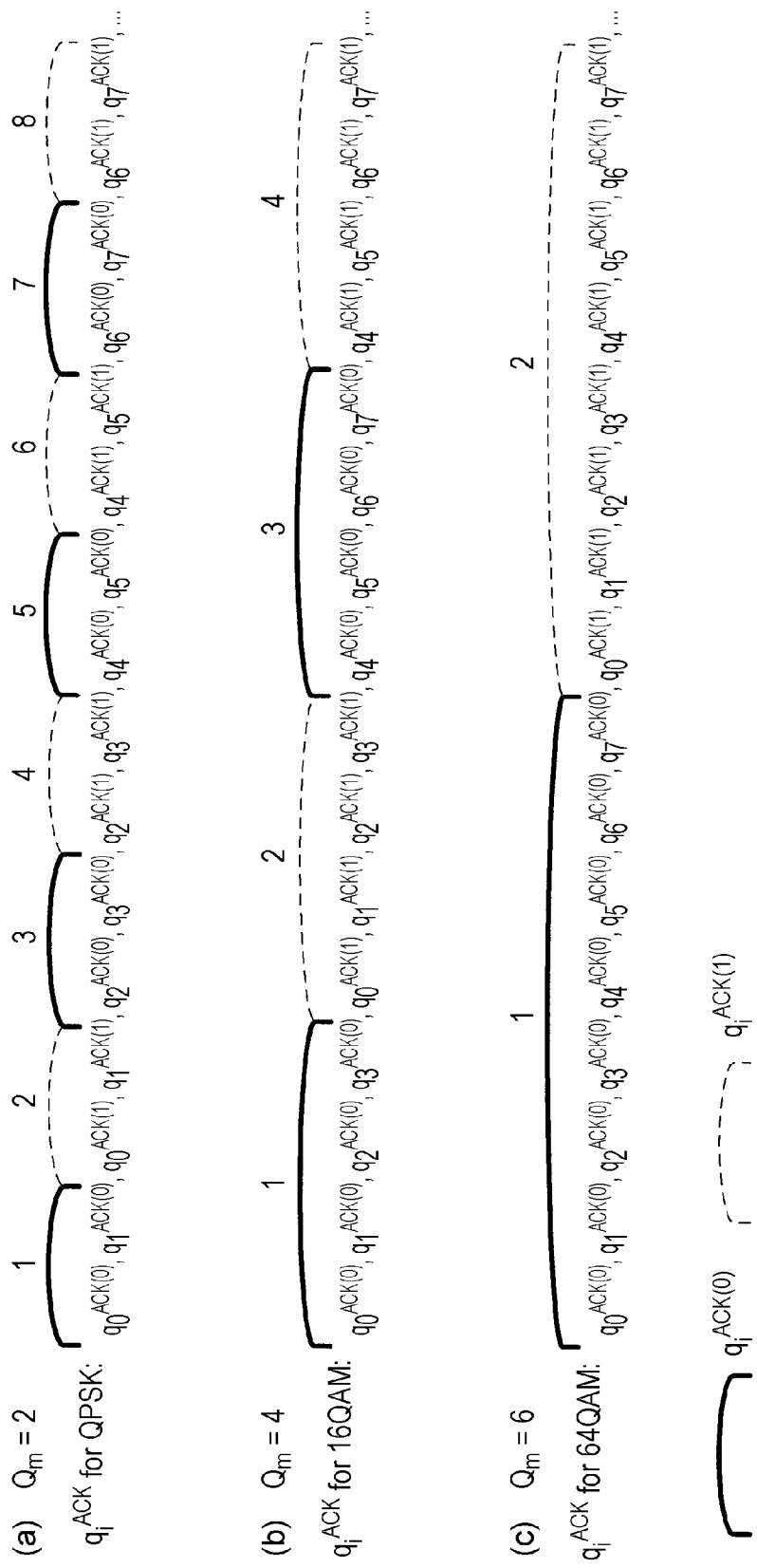
FIG. 9 includes diagrams illustrating examples of concatenated encoded bits $q_i$ of ACK/NACK according to the present invention.

FIG. 9 includes diagrams illustrating examples of the concatenated encoded bits $q_i$ of an ACK/NACK according to the present invention. Part (a) of FIG. 9 is a diagram illustrating the concatenated encoded bits $q_i$ of the ACK/NACK in a case where the ACKs/NACKs are transmitted on the PUSCH and uplink data transmitted together with the ACKs/NACKs on the PUSCH is QPSK modulated, and in a case where the ACKs/NACKs are transmitted on the PUCCH. In FIG. 9, the encoded bits $q^{(0)}{}_i$ of the first ACK/NACK segment are enclosed by thick brackets, and the encoded bits $q^{(1)}{}_i$ of the second ACK/NACK segment are enclosed by dotted brackets. In part (a) of FIG. 9, the encoded bits $q^{(0)}{}_i$ of the first ACK/NACK segment and the encoded bits $q^{(1)}{}_i$ of the second ACK/NACK segment are alternately concatenated in blocks of 2 bits starting from the bit at the beginning thereof.

Part (b) of FIG. 9 is a diagram illustrating concatenated encoded bits $q_i$ of the ACK/NACK in a case where the ACKs/NACKs are transmitted on the PUSCH and uplink data transmitted together with the ACKs/NACKs on the PUSCH is 16QAM modulated. In part (b) of FIG. 9, the encoded bits of the first ACK/NACK segment $q^{(0)}{}_i$ and the encoded bits $q^{(1)}{}_i$ of the second ACK/NACK segment are alternately concatenated in blocks of 4 bits starting from the bit at the beginning thereof. Part (c) of FIG. 9 is a diagram illustrating the concatenated encoded bits $q_i$ of the ACK/NACK in a case where the ACKs/NACKs are transmitted on the PUSCH and uplink data transmitted together with the ACKs/NACKs on the PUSCH is 64QAM modulated. In part (c) of FIG. 9, the encoded bits of the first ACK/NACK segment $q^{(0)}{}_i$ and the encoded bits $q^{(1)}{}_i$ of the second ACK/NACK segment are alternately concatenated in blocks of 6 bits starting from the bits at the beginning thereof.

That is, in a case where ACKs/NACKs are transmitted on the PUSCH, the encoded bits of the first ACK/NACK segment $q^{(0)}{}_i$ and the encoded bits $q^{(1)}{}_i$ of the second ACK/NACK segment are alternately concatenated in blocks of bits, the number of which is equal to the value of the modulation order for the modulation scheme used for uplink data on the PUSCH. That is, in a case where ACKs/NACKs are transmitted on the PUSCH, the encoded bit concatenation unit 1071f of the mobile station device 1 changes the method for concatenating the encoded bits of the first ACK/NACK segment $q^{(0)}{}_i$ and the encoded bits $q^{(1)}{}_i$ of the second ACK/NACK segment in accordance with the modulation scheme of uplink data on the PUSCH. Further, the encoded bit concatenation unit 1071f of the mobile station device 1 changes the method for concatenating the encoded bits of the first ACK/NACK segment $q^{(0)}{}_i$ and the encoded bits $q^{(1)}{}_i$ of the second ACK/NACK segment in accordance with whether the ACKs/NACKs are to be transmitted on the PUCCH or on the PUSCH.

Figure 10:
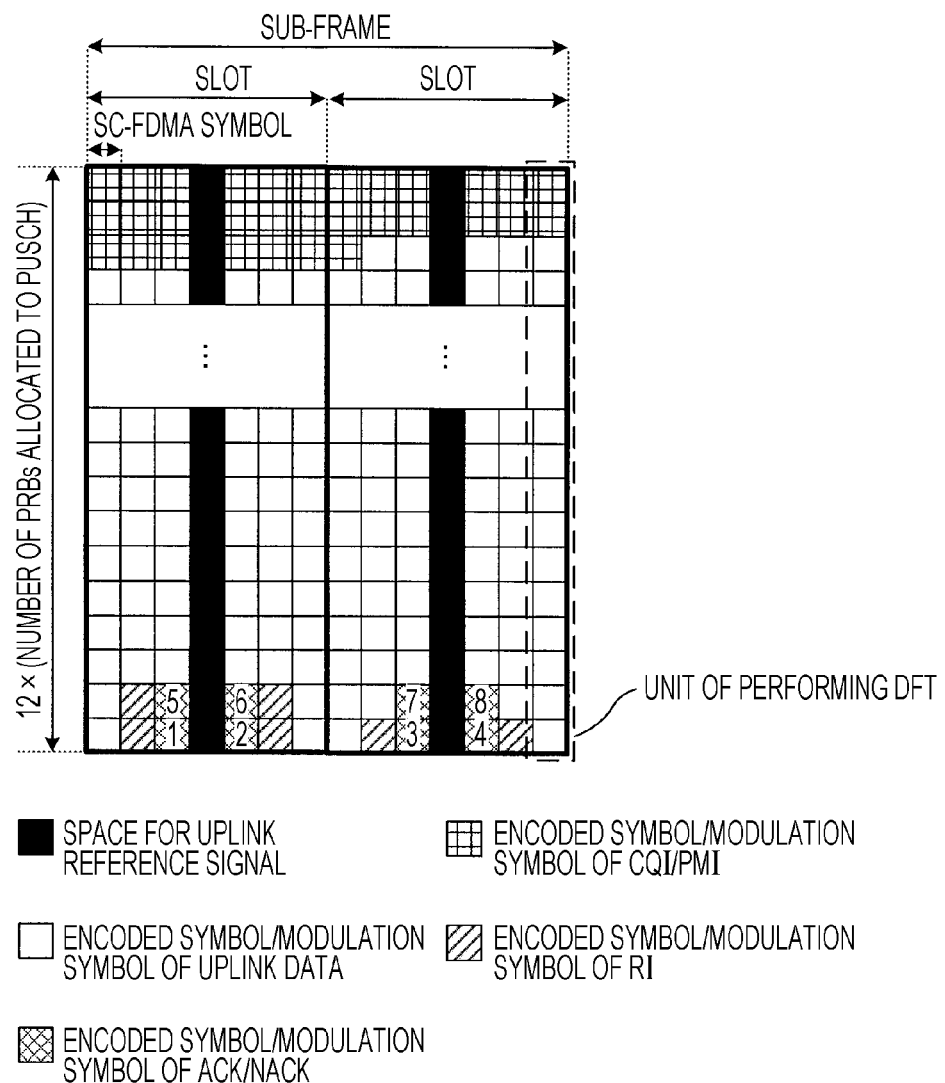
FIG. 10 is a diagram illustrating an example of an encoded-symbol interleaving method according to the present invention.

The interleaving unit 1071g concatenates and interleaves the encoded bits of the uplink data $f_i$ input from the data encoding unit 1071a and the concatenated encoded bits $q_i$ of the ACK/NACK input from the encoded bit concatenation unit 1071f, and outputs encoded bits $h_i$ obtained as a result of concatenation to the PUSCH generation unit 1073. FIG. 10 is a diagram illustrating an example of an encoded-symbol interleaving method according to the present invention. Encoded symbols are obtained by grouping encoded bits, the number of which is equal to the modulation order for the modulation scheme for uplink data on the PUSCH, and one encoded symbol is modulated to generate one modulation symbol.

In FIG. 10, there are columns, the number of which is equal to the number of SC-FDMA symbols symbols in a sub-frame. Note that encoded symbols are not mapped to the fourth and eleventh columns because these columns are regions for the uplink reference signal (DMRS). In FIG. 10, there are columns, the number of which is equal to the number of subcarriers on the PUSCH for which allocation is indicated by an uplink grant.

After encoded symbols mapped to the same column in FIG. 10 are modulated, the modulation symbols are subjected to a Discrete Fourier Transform (DFT). A signal subjected to the DFT is mapped to resource elements of the PUSCH for which the allocation of radio resources is indicated by an uplink grant. A signal subjected to the DFT, which is generated from the encoded symbols in the i-th column, is mapped to the resource elements corresponding to the i-th SC-FDMA symbol in the sub-frame.

The interleaving unit 1071 concatenates and interleaves the encoded symbols $f_i$ of the uplink data, the encoded symbols $q_i$ of the ACK/NACK, the encoded symbols of the CQI/PMI, and the encoded symbols of the RI in the manner illustrated in FIG. 10. In the present invention, for simplicity of illustration, the description of the encoding of CQI/PMI and RI is omitted. The encoded symbols of the ACK/NACK are mapped to the third, fifth, tenth, and twelfth columns. In FIG. 10, the numbers assigned to the encoded symbols of the ACK/NACK represent the order in which the encoded symbols of the ACK/NACK are mapped. The encoded symbols of the ACK/NACK are mapped in order starting from the third column in the bottom row. When the encoded symbols of the ACK/NACK are mapped to columns up to the twelfth columns, the encoded symbols of the ACK/

NACK are mapped to the next (one row above) row. This mapping operation is repeatedly performed.

In FIG. 10, the numbers assigned to the encoded symbols of the ACK/NACK correspond to the numbers assigned to the brackets which enclose the encoded bits in FIG. 9. That is, in FIG. 9, a group of encoded bits enclosed by one bracket is one encoded symbol of the ACK/NACK. In the present invention, the encoded symbols of the first ACK/NACK segment are mapped to the third and tenth columns, and are transmitted in the third and tenth SC-FDMA symbols in the sub-frame. In the present invention, the encoded symbols of the second ACK/NACK segment are mapped to the fifth and twelfth columns, and are transmitted in the fifth and twelfth SC-FDMA symbols in the sub-frame.

In this manner, since the encoded bits of the first ACK/NACK segment and the encoded bits of the second ACK/NACK segment are included in different modulation symbols, the base station device 3 may only be required to separate the modulation symbols of the first ACK/NACK segment and the modulation symbols of the second ACK/NACK segment and perform a decoding process corresponding to the conventional RM encoding process (for example, Maximum Likelihood Decision (MLD)) on each of the modulation symbols of the first ACK/NACK segment and each of the modulation symbols of the second ACK/NACK segment. Thus, the decoding process of the base station device 3 can be simplified.

In this manner, since the first ACK/NACK segment and the second ACK/NACK segment are mapped to different SC-FDMA symbols, the number of encoded symbols of the first ACK/NACK segment and the number of encoded symbols of the second ACK/NACK segment which can be transmitted on the PUSCH can be equalized if it is not possible to sufficiently transmit the encoded bits of the first ACK/NACK segment and the second ACK/NACK segment on the radio resource allocated to the PUSCH on which the ACK/NACK is to be transmitted. Thus, the characteristics of the first ACK/NACK segment and the second ACK/NACK segment can be equally maintained.

The PUSCH generation unit 1073 modulates the concatenated encoded bits $h_i$ input from the interleaving unit 1071g to generate modulation symbols. The PUSCH generation unit 1073 performs a DFT on modulation symbols mapped to the same column in FIG. 10, and outputs a PUSCH signal subjected to the DFT to the multiplexing unit 1077.

Figure 11:
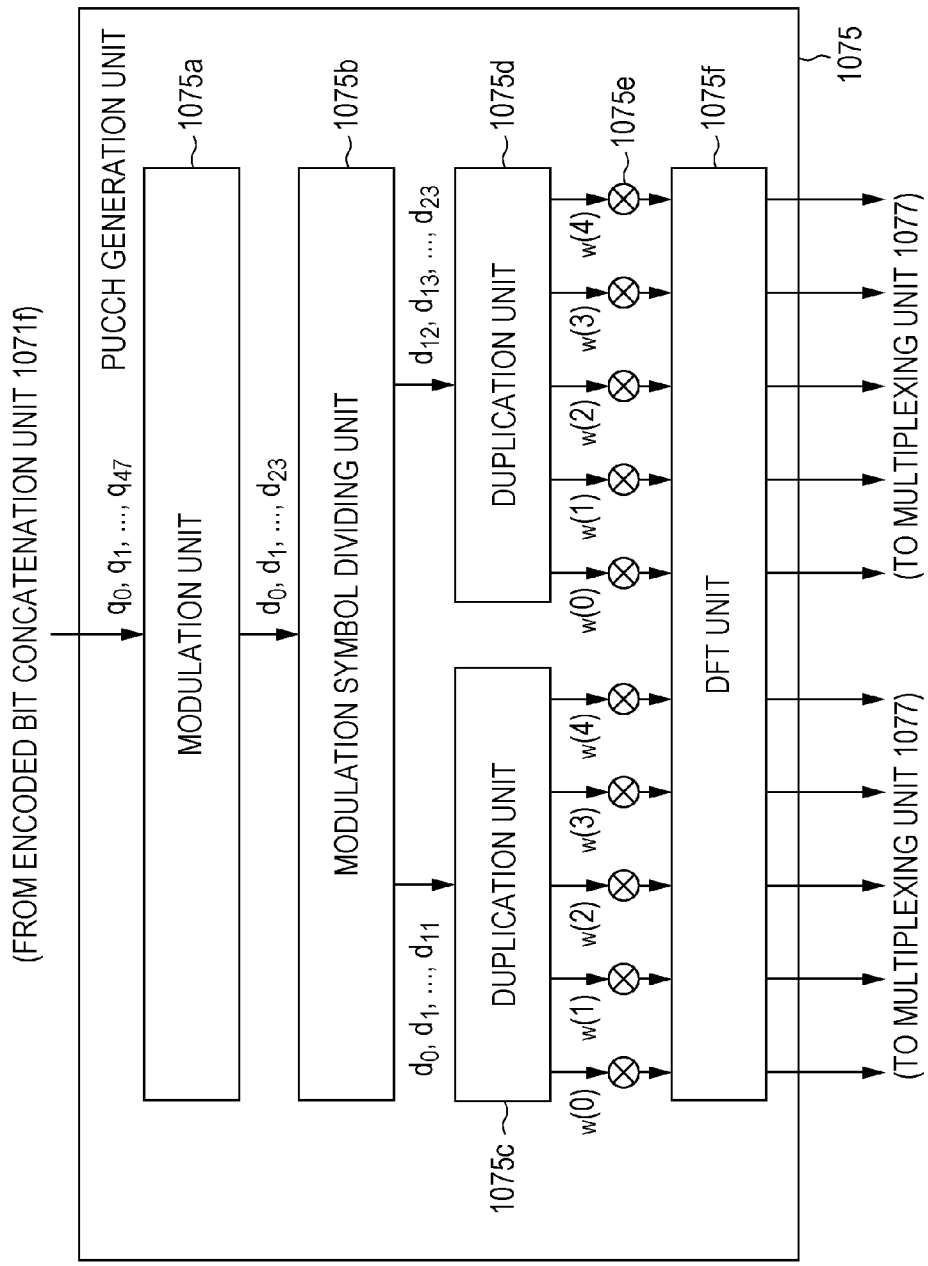
FIG. 11 is a schematic block diagram illustrating the configuration of a PUCCH generation unit 1075 according to the present invention.

FIG. 11 is a schematic block diagram illustrating the configuration of the PUCCH generation unit 1075 according to the present invention. The PUCCH generation unit 1075 includes a modulation unit 1075a, a modulation symbol dividing unit 1075b, a duplication unit 1075c, a duplication unit 1075d, multiplication units 1075e, and a DFT unit 1075f. The modulation unit 1075a QPSK modulates the concatenated encoded bits $(q_0, q_1, \ldots, q_{47})$ of the ACK/NACK input from the encoded bit concatenation unit 1071f, and outputs the QPSK modulation symbols $(d_0, d_1, \ldots, d_{23})$ to the modulation symbol dividing unit 1075b. The encoded bits of the first ACK/NACK segment $q^{(0)}_i$ and the encoded bits of the second ACK/NACK segment $q^{(1)}_i$ are concatenated in accordance with expression (7). Thus, the QPSK modulation symbols $d_i$ are generated from the encoded bits of only either the first ACK/NACK segment or the second ACK/NACK segment.

The modulation symbol dividing unit 1075b divides the QPSK modulation symbols $d_i$ input from the modulation unit 1075a into halves, and outputs a block of upper modulation symbols $(d_0, d_1, \ldots, d_{11})$ obtained as a result of division to the duplication unit 1075c, and a block of lower modulation symbols $(d_{12}, d_{13}, \ldots, d_{23})$ obtained as a result of division to the duplication unit 1075d. The duplication unit 1075c duplicates the block of upper modulation symbols $(d_0, d_1, \ldots, d_{11})$ obtained as a result of division, which are input from the modulation symbol dividing unit 1075b, to produce five blocks, and outputs the duplicated blocks of upper modulation symbols $(d_0, d_1, \ldots, d_{11})$ to the multiplication units 1075e. The duplication unit 1075d duplicates the block of lower modulation symbols $(d_{12}, d_{13}, \ldots, d_{23})$ obtained as a result of division, which are input from the modulation symbol dividing unit 1075b, to produce five blocks, and outputs the duplicated blocks of lower modulation symbols $(d_{12}, d_{13}, \ldots, d_{23})$ to the multiplication units 1075e.

The multiplication units 1075e multiply (code spread) the duplicated blocks of upper modulation symbols $(d_0, d_1, \ldots, d_{11})$ and the duplicated blocks of lower modulation symbols $(d_{12}, d_{13}, \ldots, d_{23})$ input from the duplication unit 1075c and the duplication unit 1075d using orthogonal codes (Orthogonal Cover Codes: OCCs) [w(0)w(1)w(2)w(3)w(4)], and outputs the code spread blocks of upper modulation symbols $(w(i) \cdot d_0, w(i) \cdot d_1, \ldots, w(i) \cdot d_{11})$ and the code spread blocks of lower modulation symbols $(w(i) \cdot d_{12}, w(i) \cdot d_{13}, \ldots, w(i) \cdot d_{23})$ to the DFT unit. Note that the duplicated blocks of upper modulation symbols $(d_0, d_1, \ldots, d_{11})$ and the duplicated blocks of lower modulation symbols $(d_{12}, d_{13}, \ldots, d_{23})$ may be multiplied by the same orthogonal code or different orthogonal codes.

The DFT unit 1075f performs a DFT of a sequence length of 12, for each block of modulation symbols, on the code spread blocks of upper modulation symbols $(w(i) \cdot d_0, w(i) \cdot d_1, \ldots, w(i) \cdot d_{11})$ and the code spread blocks of lower modulation symbols $(w(i) \cdot d_{12}, w(i) \cdot d_{13}, \ldots, w(i) \cdot d_{23})$ input from the multiplication units 1075e, and outputs a PUCCH signal subjected to the DFT to the multiplexing unit 1077.

The uplink reference signal generation unit 10711 generates a sequence known to the base station device 3, which is determined using a predetermined rule based on a physical cell identity (referred to as PCI, Cell ID, or the like) for identifying the base station device 3, a bandwidth to which the uplink reference signal is mapped, the cyclic shift notified by using an uplink grant, and the like, and outputs a generated uplink reference signal to the multiplexing unit 1077.

The multiplexing unit 1075 multiplexes the PUSCH signal input from the PUSCH generation unit, and/or the PUCCH signal input from the PUCCH generation unit, and/or the uplink reference signal input from the uplink reference signal generation unit 10711 with uplink resource elements for each transmit antenna port in accordance with the control signal input from the control unit 103.

The radio transmitting unit 1077 performs an Inverse Fast Fourier Transform (IFFT) on the multiplexed signal to perform SC-FDMA modulation, adds a guard interval to the SC-FDMA modulated SC-FDMA symbols, generates a baseband digital signal, converts the baseband digital signal into an analog signal, generates an intermediate-frequency in-phase component and quadrature component from the analog signal, removes the extra frequency components corresponding to the intermediate frequency band, converts (up converts) the intermediate-frequency signal into a high-frequency signal, removes the extra frequency components, performs power amplification, and outputs the result to the transmit/receive antenna 109 for transmission.

Hereinafter, the device configuration of the base station device 3 according to the present invention will be described.

Figure 12:
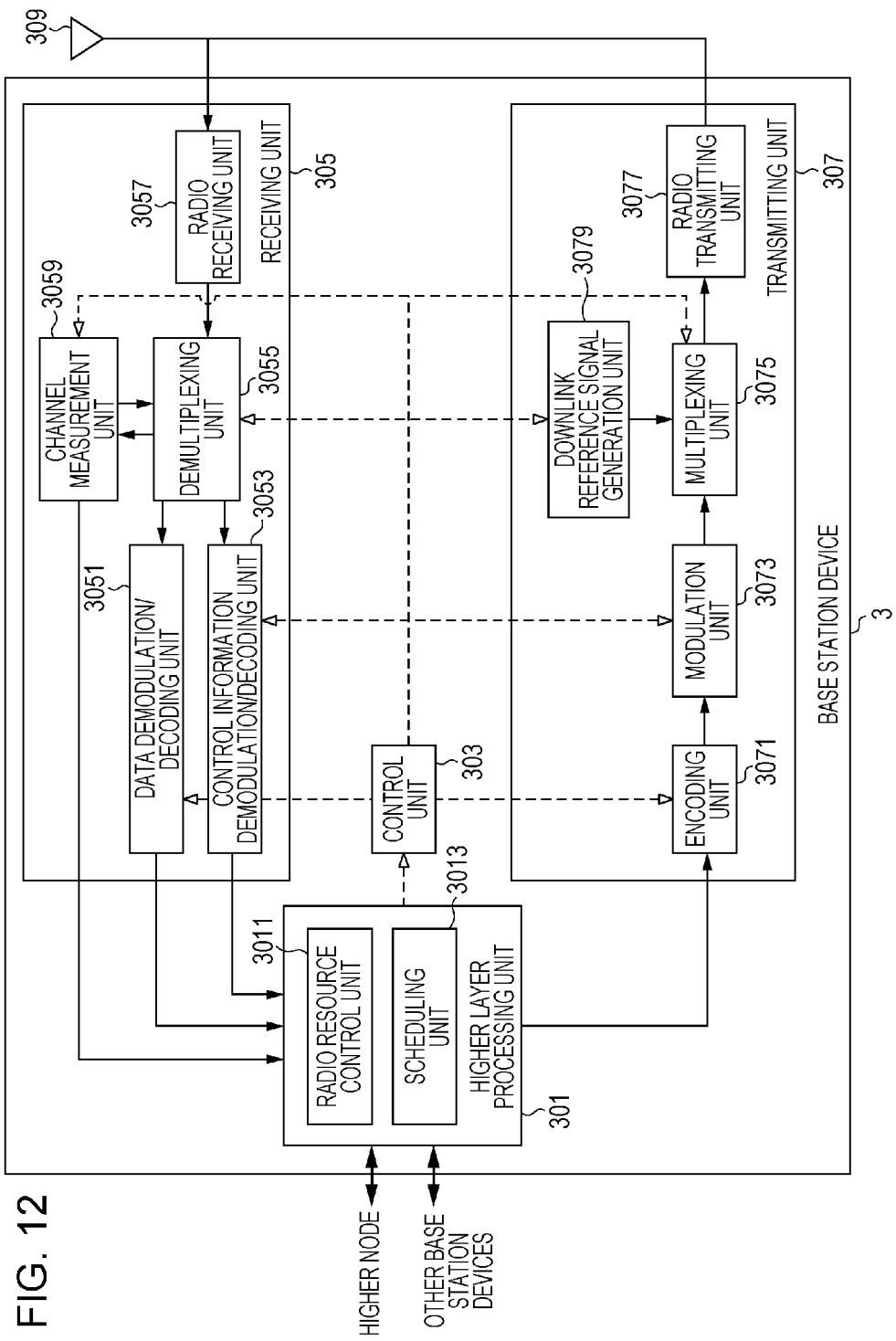
FIG. 12 is a schematic block diagram illustrating the configuration of a base station device 3 according to the present invention.

FIG. 12 is a schematic block diagram illustrating the configuration of the base station device 3 according to the present invention. As illustrated in the drawing, the base station device 3 includes a higher layer processing unit 301, a control unit 303, a receiving unit 305, a transmitting unit 307, and a transmit/receive antenna 309. The higher layer processing unit 301 includes a radio resource control unit 3011 and a scheduling unit 3013. The receiving unit 305 includes a data demodulation/decoding unit 3051, a control information demodulation/decoding unit 3053, a demultiplexing unit 3055, a radio receiving unit 3057, and a channel measurement unit 3059. The transmitting unit 307 includes an encoding unit 3071, a modulation unit 3073, a multiplexing unit 3075, a radio transmitting unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Further, the higher layer processing unit 301 generates control information to control the receiving unit 305 and the transmitting unit 307, and outputs the control information to the control unit 303.

The radio resource control unit 3011 included in the higher layer processing unit 301 generates downlink data, an RRC signal, and a MAC CE (Control Element), which are mapped to the PDSCH for downlink, or acquires them from the higher node, and outputs them to the HARQ control unit 3013. Further, the radio resource control unit 3011 manages various kinds of setting information on each of the mobile station devices 1. For example, the radio resource control unit 3011 performs operations such as managing serving cells set in the mobile station devices 1.

The scheduling unit 3013 included in the higher layer processing unit 301 manages radio resources for the PUSCH or PUCCH, which are allocated to the mobile station devices 1. When radio resources for the PUSCH are allocated to the mobile station devices 1, the scheduling unit 3013 generates an uplink grant indicating the allocation of radio resources for the PUSCH, and outputs the generated uplink grant to the transmitting unit 307.

The control unit 303 generates a control signal to control the receiving unit 305 and the transmitting unit 307, based on the control information from the higher layer processing unit 301. The control unit 303 outputs the generated control signal to the receiving unit 305 and the transmitting unit 307, and controls the receiving unit 305 and the transmitting unit 307.

The receiving unit 305 separates, demodulates, and decodes the reception signals received from the mobile station devices 1 through the transmit/receive antenna 309 in accordance with the control signal input from the control unit 303, and outputs the decoded information to the higher layer processing unit 301.

The radio receiving unit 3057 converts (down coverts) an uplink signal received through the transmit/receive antenna 309 into an intermediate-frequency signal, removes the unnecessary frequency components, controls the amplification level so that the signal level can be appropriately maintained, orthogonally demodulates the received signal on the basis of its in-phase component and quadrature component, and converts the orthogonally demodulated analog signal into a digital signal. The radio receiving unit 3057 removes a portion corresponding to the Guard Interval (GI) from the converted digital signal. The radio receiving unit 3057 performs a Fast Fourier Transform (FFT) on the signal from which the guard interval has been removed, extracts a signal in the frequency domain, and outputs the extracted signal to the demultiplexing unit 3055.

The demultiplexing unit 3055 separates the signal input from the radio receiving unit 3057 into signals such as the PUCCH, the PUSCH, and the uplink reference signal. This separation is based on radio resource allocation information included in an uplink grant determined in advance by the base station device 3 using the radio resource control unit 3011 and reported to the mobile station devices 1. The demultiplexing unit 3055 performs propagation path compensation for the PUCCH and PUSCH using the estimated values of the propagation paths input from the channel measurement unit 3059. Further, the demultiplexing unit 3055 outputs the separated uplink reference signal to the channel measurement unit 3059.

The demultiplexing unit 3055 performs an Inverse Discrete Fourier Transform (IDFT) on the separated PUCCH and PUSCH signals, and acquires modulation symbols of the uplink data and modulation symbols of the uplink control information (ACK/NACK). The demultiplexing unit 3055 outputs the modulation symbols of the uplink data acquired from the PUSCH signal to the data demodulation/decoding unit 3051. The demultiplexing unit 3055 outputs the modulation symbols of the uplink control information (ACK/NACK) acquired from the PUCCH signal or PUSCH signal to the control information demodulation/decoding unit 3053.

The channel measurement unit 3059 measures the estimated values of the propagation paths, the quality of the channels, and so forth from the uplink reference signal input from the demultiplexing unit 3055, and outputs the results to the demultiplexing unit 3055 and the higher layer processing unit 301.

The data demodulation/decoding unit 3051 demodulates the modulation symbols of the uplink data input from the demultiplexing unit 3055, decodes the demodulated encoded bits of the uplink data, and outputs the decoded uplink data to the higher layer processing unit 301.

The control information demodulation/decoding unit 3053 decodes the first ACK/NACK segment by applying the maximum likelihood decision or the like to the modulation symbols corresponding to the first ACK/NACK segment among the modulation symbols of the ACK/NACK input from the demultiplexing unit 3055. The control information demodulation/decoding unit 3053 decodes the second ACK/NACK segment by applying the maximum likelihood decision or the like to the modulation symbols corresponding to the second ACK/NACK segment among the modulation symbols of the ACK/NACK input from the demultiplexing unit 3055. The control information demodulation/decoding unit 3053 concatenates the decoded first ACK/NACK segment and second ACK/NACK segment, and outputs the concatenated ACK/NACK to the higher layer processing unit 301.

The transmitting unit 307 generates a downlink reference signal in accordance with a control signal input from the control unit 303, encodes and modulates the HARQ indicator, downlink control information, and downlink data input from the higher layer processing unit 301, multiplexes the PHICH, the PDCCH, the PDSCH, and the downlink reference signal, and transmits a signal to the mobile station device 1 via the transmit/receive antenna 309.

The encoding unit 3071 encodes the HARQ indicator, downlink control information, and downlink data input from the higher layer processing unit 301 using a predetermined coding scheme such as block coding, convolutional coding, or turbo coding, or using a coding scheme determined by the radio resource control unit 3011. The modulation unit 3073 modulates the encoded bits input from the encoding unit 3071 using a predetermined modulation scheme such as BPSK, QPSK, 16QAM, or 64QAM or using a modulation scheme determined by the radio resource control unit 3011.

The downlink reference signal generation unit 3079 generates as a downlink reference signal a sequence known to the mobile station devices 1, which is determined using a predetermined rule based on a physical cell identity (PCI) for identifying the base station device 3 and the like. The multiplexing unit 3075 multiplexes the modulation symbols for each channel, which have been modulated, and the generated downlink reference signal.

The radio transmitting unit 3077 performs an Inverse Fast Fourier Transform (IFFT) on the multiplexed modulation symbols and the like to perform OFDM modulation, adds a guard interval to the OFDM modulated OFDM symbols, generates a baseband digital signal, converts the baseband digital signal into an analog signal, generates an intermediate-frequency in-phase component and quadrature component from the analog signal, removes the extra frequency components for the intermediate-frequency band, converts (up converts) the intermediate-frequency signal into a high-frequency signal, removes the extra frequency components, performs power amplification, and outputs the result to the transmit/receive antenna 309 for transmission.

Hereinafter, the operation of each of the mobile station devices 1 and the base station device 3 according to the present invention will be described with reference to flowcharts.

Figure 13:
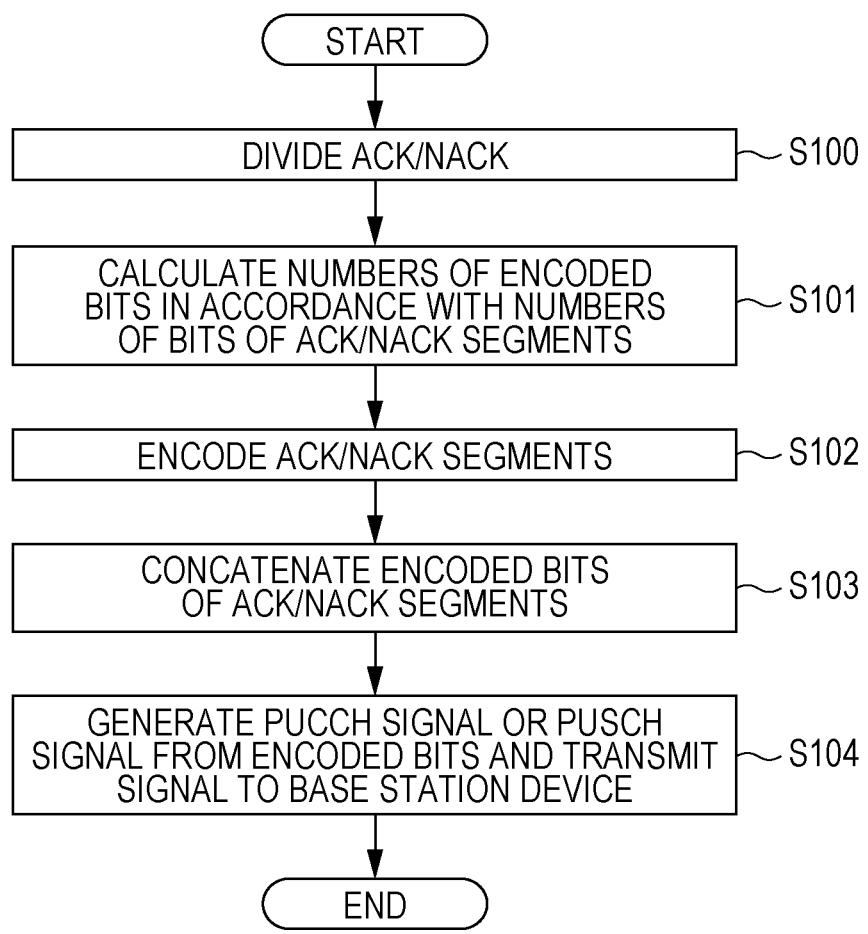
FIG. 13 is a flowchart illustrating an example of the operation of the mobile station device 1 according to the present invention.

FIG. 13 is a flowchart illustrating an example of the operation of each of the mobile station devices 1 according to the present invention. First, the mobile station device 1 divides ACKs/NACKs to be transmitted in the same subframe to generate a first ACK/NACK segment and a second ACK/NACK segment (step S100), and calculates the number of encoded bits of each of the ACK/NACK segments in accordance with the number of bits of each of the ACK/NACK segments (step S101).

The mobile station device 1 separately encodes the ACK/NACK segments obtained as a result of division in step S100 (step S102). The mobile station device 1 concatenates the encoded bits of the ACK/NACK segments encoded in step S102 (step S103). The mobile station device 1 changes the method for concatenating the encoded bits of the ACK/NACK segments in step S103 depending on whether the ACKs/NACKs are transmitted on the PUCCH or on the PUSCH. Further, in a case where the ACK/NACK is transmitted on the PUSCH, the mobile station device 1 changes the method for concatenating the encoded bits of the ACK/NACK segments in step S103 in accordance with the modulation scheme of uplink data on the PUSCH on which the ACK/NACK is to be transmitted.

The mobile station device 1 generates a PUCCH signal or PUSCH signal from the concatenated encoded bits of the ACK/NACK, and transmits the ACKs/NACKs to the base station device 3 on the PUSCH or PUCCH (step S104). After step S104, the mobile station device 1 ends the process for the transmission of the ACK/NACK.

Figure 14:
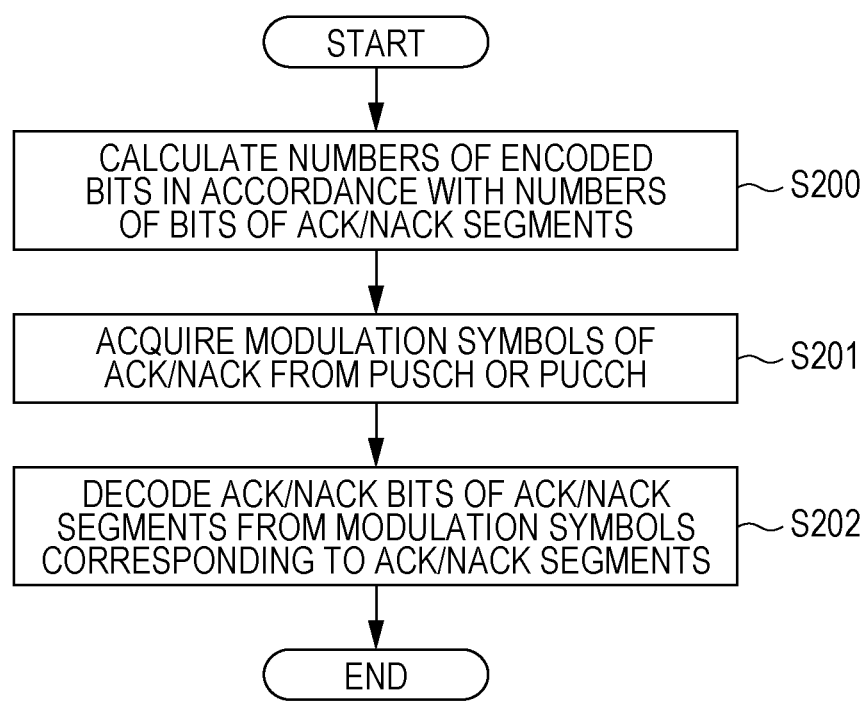
FIG. 14 is a flowchart illustrating an example of the operation of the base station device 3 according to the present invention.

FIG. 14 is a flowchart illustrating an example of the operation of the base station device 3 according to the present invention. First, the base station device 3 calculates the number of encoded bits of each of the ACK/NACK segments and the number of modulation symbols of each of the ACK/NACK segments in accordance with the number of bits of each of the ACK/NACK segments (step S200). The base station device 3 acquires the modulation symbols of the ACK/NACK from the PUSCH or PUCCH (step S201), and performs a decoding process for each modulation symbol corresponding to each of the ACK/NACK segments to decode ACK/NACK segments (step S202). After step S202, the base station device 3 ends the process for the reception of the ACK/NACK.

In the present invention, the encoded bits of the first ACK/NACK segment and the encoded bits of the second ACK/NACK segment are alternately concatenated, and then the concatenated encoded bits of the ACK/NACK are modulated. Alternatively, the encoded bits of the second ACK/NACK segment may be concatenated with the least significant bit of the encoded bits of the first ACK/NACK segment, the concatenated encoded bits of the ACK/NACK may be modulated, and then the modulation symbols corresponding to the first ACK/NACK segment and the modulation symbols corresponding to the second ACK/NACK segment may be alternately rearranged.

In the present invention, accordingly, each of the mobile station devices 1 divides a plurality of ACKs/NACKs indicating success or failure of decoding of a plurality of pieces of uplink data received from the base station device 3, separately encodes the divided ACKs/NACKs, changes a method for concatenating the encoded bits of the separately encoded ACKs/NACKs in accordance with whether the ACKs/NACKs are to be transmitted on a physical uplink control channel or on a physical uplink shared channel, and transmits an ACK/NACK signal generated from the concatenated encoded bits of the ACKs/NACKs to the base station device 3 on a physical uplink control channel or a physical uplink shared channel, and the base station device 3 receives the ACK/NACK signal from the mobile station device 1, and performs a decoding process on the received ACK/NACK signal.

In the present invention, furthermore, each of the mobile station devices 1 divides a plurality of ACKs/NACKs indicating success or failure of decoding of a plurality of pieces of uplink data received from the base station device 3, separately encodes the divided ACKs/NACKs, changes a method for concatenating the encoded bits of the separately encoded ACKs/NACKs in accordance with the modulation scheme of uplink data on a physical uplink shared channel on which the ACKs/NACKs are to be transmitted, and transmits an ACK/NACK signal generated from the concatenated encoded bits of the ACKs/NACKs to the base station device 3 on the physical uplink shared channel, and the base station device 3 receives the ACK/NACK signal from the mobile station device 1, and performs a decoding process on the received ACK/NACK signal.

Thus, the encoded bits of the divided ACKs/NACKs can be included in different modulation symbols, and the base station device 3 may only be required to perform a decoding process corresponding to a conventional RM encoding process on the modulation symbols of each of the divided ACKs/NACKs. The decoding process of the base station device 3 can therefore be simplified.

In the present invention, furthermore, each of the mobile station devices 1 divides a plurality of ACKs/NACKs each indicating success or failure of decoding of a plurality of pieces of uplink data received from the base station device, separately encodes the divided ACKs/NACKs, and transmits the encoded bits of the separately encoded ACKs/NACKs to the base station device 3 in different time symbols on a physical uplink shared channel, and the base station device 3 receives signals of the ACKs/NACKs from the mobile station device 1, and performs a decoding process on the received signals of the ACKs/NACKs.

Thus, if it is not possible to sufficiently transmit the encoded bits of the ACKs/NACKs on the radio resources allocated to the PUSCH on which the ACKs/NACKs are to be transmitted, the number of encoded bits of the divided ACKs/NACKs, which can be transmitted on the PUSCH, can be equalized, and the characteristics of the divided ACKs/NACKs can be equally maintained.

In the present invention, furthermore, each of the mobile station devices 1 divides a plurality of ACKs/NACKs indicating success or failure of decoding of a plurality of pieces of uplink data received from the base station device 3, and calculates the number of encoded bits of each of the divided ACKs/NACKs using the number of bits of each of the divided ACKs/NACKs, and the base station device 3 calculates the number of encoded bits of each of the ACKs/NACKs divided by the mobile station device 1 using the number of bits of each of the divided ACKs/NACKs. Thus, the number of radio resources to be used for the transmission of each of the divided ACKs/NACKs, and the number of encoded bits of each of the divided ACKs/NACKs can be appropriately controlled in accordance with the number of bits of each of the divided ACKs/NACKs.

(a) In addition, the present invention may also include the following embodiments. That is, a wireless communication system according to the present invention is a wireless communication system including a base station device and a mobile station device which communicate with each other, wherein the mobile station device divides a plurality of ACKs/NACKs indicating success or failure of decoding of a plurality of pieces of uplink data received from the base station device, separately encodes the divided ACKs/NACKs, changes a method for concatenating the encoded bits of the separately encoded ACKs/NACKs in accordance with whether the ACKs/NACKs are to be transmitted on a physical uplink control channel or on a physical uplink shared channel, and transmits an ACK/NACK signal generated from the concatenated encoded bits of the ACKs/NACKs to the base station device on a physical uplink control channel or a physical uplink shared channel, and the base station device receives the ACK/NACK signal from the mobile station device, and performs a decoding process on the received ACK/NACK signal.

(b) Further, a wireless communication system according to the present invention is a wireless communication system including a base station device and a mobile station device which communicate with each other, wherein the mobile station device divides a plurality of ACKs/NACKs indicating success or failure of decoding of a plurality of pieces of uplink data received from the base station device, separately encodes the divided ACKs/NACKs, changes a method for concatenating the encoded bits of the separately encoded ACKs/NACKs in accordance with a modulation scheme of uplink data on a physical uplink shared channel on which the ACKs/NACKs are to be transmitted, and transmits an ACK/NACK signal generated from the concatenated encoded bits of the ACKs/NACKs to the base station device on the physical uplink shared channel, and the base station device receives the ACK/NACK signal from the mobile station device, and performs a decoding process on the received ACK/NACK signal.

(c) Further, a wireless communication system according to the present invention is a wireless communication system including a base station device and a mobile station device which communicate with each other, wherein the mobile station device divides a plurality of ACKs/NACKs indicating success or failure of decoding of a plurality of pieces of uplink data received from the base station device, separately encodes the divided ACKs/NACKs, and transmits each of the encoded bits of the separately encoded ACKs/NACKs to the base station device in a different time symbol on a physical uplink shared channel, and the base station device receives the ACK/NACK signal from the mobile station device, and performs a decoding process of the receives ACK/NACK signal.

(d) Further, a wireless communication system according to the present invention is a wireless communication system including a base station device and a mobile station device which communicate with each other, wherein the mobile station device divides a plurality of ACKs/NACKs indicating success or failure of decoding of a plurality of pieces of uplink data received from the base station device, and calculates the number of encoded bits of each of the divided ACKs/NACKs using the number of bits of each of the divided ACKs/NACKs, and the base station device calculates the number of encoded bits of each of the ACKs/NACKs divided by the mobile station device using the number of bits of each of the divided ACKs/NACKs.

(e) Further, a mobile station device according to the present invention is a mobile station device for communicating with a base station device, wherein the mobile station device divides a plurality of ACKs/NACKs indicating success or failure of decoding of a plurality of pieces of uplink data received from the base station device, separately encodes the divided ACKs/NACKs, changes a method for concatenating the encoded bits of the separately encoded ACKs/NACKs in accordance with whether the ACKs/NACKs are to be transmitted on a physical uplink control channel or a physical uplink shared channel, and transmits an ACK/NACK signal generated from the concatenated encoded bits of the ACKs/NACKs to the base station device on a physical uplink control channel or a physical uplink shared channel.

(f) Further, a mobile station device according to the present invention is a mobile station device for communicating with a base station device, wherein the mobile station device divides a plurality of ACKs/NACKs indicating success or failure of decoding of a plurality of pieces of uplink data received from the base station device, separately encodes the divided ACKs/NACKs, changes a method for concatenating the encoded bits of the separately encoded ACKs/NACKs in accordance with a modulation scheme of uplink data on a physical uplink shared channel on which the ACKs/NACKs are to be transmitted, and transmits an ACK/NACK signal generated from the concatenated encoded bits of the ACKs/NACKs to the base station device on the physical uplink shared channel.

(g) Further, a mobile station device according to the present invention is a mobile station device for communicating with a base station device, wherein the mobile station device divides a plurality of ACKs/NACKs indicating success or failure of decoding of a plurality of pieces of uplink data received from the base station device, separately encodes the divided ACKs/NACKs, and transmits each of divided encoded bits of the separately encoded ACKs/NACKs to the base station device in a different time symbol on a physical uplink shared channel.

(h) Further, a mobile station device according to the present invention is a mobile station device for communicating with a base station device, wherein the mobile station device divides a plurality of ACKs/NACKs indicating success or failure of decoding of a plurality of pieces of uplink data received from the base station device, and calculates the number of encoded bits of each of the divided ACKs/NACKs using the number of bits of each of the divided ACKs/NACKs.

(i) Further, a base station device according to the present invention is a base station device for communicating with a mobile station device, wherein the mobile station device divides a plurality of ACKs/NACKs indicating success or failure of decoding of a plurality of pieces of uplink data received from the base station device, separately encodes the divided ACKs/NACKs, changes a method for concatenating the encoded bits of the separately encoded ACKs/NACKs in accordance with whether the ACKs/NACKs are to be transmitted on a physical uplink control channel or on a physical uplink shared channel, and transmits an ACK/NACK signal generated from the concatenated encoded bits of the ACKs/NACKs on a physical uplink control channel or a physical uplink shared channel, and the base station device receives the ACK/NACK signal from the mobile station device, and performs a decoding process on the received ACK/NACK signal.

(j) Further, a base station device according to the present invention is a base station device for communicating with a mobile station device, wherein the mobile station device divides a plurality of ACKs/NACKs indicating success or failure of decoding of a plurality of pieces of uplink data received from the base station device, separately encodes the divided ACKs/NACKs, changes a method for concatenating the encoded bits of the separately encoded ACKs/NACKs in accordance with a modulation scheme of uplink data on a physical uplink shared channel on which the ACKs/NACKs are to be transmitted, and transmits an ACK/NACK signal generated from the concatenated encoded bits of the ACKs/NACKs on the physical uplink shared channel, and the base station device receives the ACK/NACK signal from the mobile station device, and performs a decoding process on the received ACK/NACK signal.

(k) Further, a base station device according to the present invention is a base station device for communicating with a mobile station device, wherein the mobile station device divides a plurality of ACKs/NACKs indicating success or failure of decoding of a plurality of pieces of uplink data received from the base station device, separately encodes the divided ACKs/NACKs, and transmits each of the encoded bits of the separately encoded ACKs/NACKs in a different time symbol on a physical uplink shared channel, and the base station device receives signals of the ACKs/NACKs from the mobile station device, and performs a decoding process on the received signals of the ACKs/NACKs.

(l) Further, a base station device according to the present invention is a base station device for communicating with a mobile station device, wherein the mobile station device divides a plurality of ACKs/NACKs indicating success or failure of decoding of a plurality of pieces of uplink data received from the base station device, and the base station device calculates the number of encoded bits of each of the ACKs/NACKs divided by the mobile station device using the number of bits of the divided ACKs/NACKs.

(m) Further, a wireless communication method according to the present invention is a wireless communication method used in a mobile station device that communicates with a base station device, wherein the wireless communication method includes a step of dividing a plurality of ACKs/NACKs indicating success or failure of decoding of a plurality of pieces of uplink data received from the base station device, step of separately encoding the divided ACKs/NACKs, and a step of changing a method for concatenating the encoded bits of the separately encoded ACKs/NACKs in accordance with whether the ACKs/NACKs are to be transmitted on a physical uplink control channel or on a physical uplink shared channel.

(n) Further, a wireless communication method according to the present invention is a wireless communication method used in a mobile station device that communicates with a base station device, wherein the wireless communication method includes a step of dividing a plurality of ACKs/NACKs indicating success or failure of decoding of a plurality of pieces of uplink data received from the base station device, a step of separately encoding the divided ACKs/NACKs, and a step of changing a method for concatenating the encoded bits of the separately encoded ACKs/NACKs in accordance with a modulation scheme of uplink data on a physical uplink shared channel on which the ACKs/NACKs are to be transmitted.

(o) Further, a wireless communication method according to the present invention is a wireless communication method used in a mobile station device that communicates with a base station device, wherein the wireless communication method includes a step of dividing a plurality of ACKs/NACKs indicating success or failure of decoding of a plurality of pieces of uplink data received from the base station device, a step of separately encoding the divided ACKs/NACKs, and a step of transmitting each of the encoded bits of the separately encoded ACKs/NACKs to the base station device in a different time symbol on a physical uplink shared channel.

(p) Further, a wireless communication method according to the present invention is a wireless communication method used in a mobile station device that communicates with a base station device, wherein the wireless communication method includes a step of dividing a plurality of ACKs/NACKs indicating success or failure of decoding of a plurality of pieces of uplink data received from the base station device, and a step of calculating the number of encoded bits of each of the divided ACKs/NACKs using the number of bits of each of the divided ACKs/NACKs.

(q) Further, a wireless communication method according to the present invention is a wireless communication method used in a base station device that communicates with a mobile station device, wherein the wireless communication method includes a step of, using the mobile station device, dividing a plurality of ACKs/NACKs indicating success or failure of decoding of a plurality of pieces of uplink data received from the base station device, separately encoding the divided ACKs/NACKs, changing a method for concatenating the encoded bits of the separately encoded ACKs/NACKs in accordance with the ACKs/NACKs are transmitted on a physical uplink control channel or on a physical uplink shared channel, and transmitting an ACK/NACK signal generated from the concatenated encoded bits of the ACKs/NACKs on a physical uplink control channel or a physical uplink shared channel, and a step of receiving the ACK/NACK signal from the mobile station device and performing a decoding process on the received ACK/NACK signal.

(r) Further, a wireless communication method according to the present invention is a wireless communication method used in a base station device that communicates with a mobile station device, wherein the wireless communication method includes a step of, using the mobile station device, dividing a plurality of ACKs/NACKs indicating success or failure of decoding of a plurality of pieces of uplink data received from the base station device, separately encoding the divided ACKs/NACKs, changing a method for concatenating the encoded bits of the separately encoded ACKs/

NACKs in accordance with a modulation scheme of uplink data on a physical uplink shared channel on which the ACKs/NACKs are to be transmitted, and transmitting an ACK/NACK signal generated from the concatenated encoded bits of the ACKs/NACKs on the physical uplink shared channel, and receiving the ACK/NACK signal from the mobile station device, and a step of performing a decoding process on the received ACK/NACK signal.

(s) Further, a wireless communication method according to the present invention is a wireless communication method used in a base station device that communicates with a mobile station device, wherein the wireless communication method includes a step of, using the mobile station device, dividing a plurality of ACKs/NACKs indicating success or failure of decoding of a plurality of pieces of uplink data received from the base station device, separately encoding the divided ACKs/NACKs, and transmitting each of the encoded bits of the separately encoded ACKs/NACKs to the base station device in a different time symbol on a physical uplink shared channel, and receiving signals of the ACKs/NACKs from the mobile station device, and a step of performing a decoding process on the received signals of the ACKs/NACKs.

(t) Further, a wireless communication method according to the present invention is a wireless communication method used in a base station device that communicates with a mobile station device, wherein the wireless communication method includes a step of, using the mobile station device, dividing a plurality of ACKs/NACKs indicating success or failure of decoding of a plurality of pieces of uplink data received from the base station device, and calculating the number of encoded bits of each of the ACKs/NACKs divided by the mobile station device using the number of bits of each of the divided ACKs/NACKs.

(u) Further, an integrated circuit according to the present invention is an integrated circuit used in a mobile station device that communicates with a base station device, wherein a series of functions including a function for dividing a plurality of ACKs/NACKs indicating success or failure of decoding of a plurality of pieces of uplink data received from the base station device, a function for separately encoding the divided ACKs/NACKs, and a function for changing a method for concatenating the encoded bits of the separately encoded ACKs/NACKs in accordance with whether the ACKs/NACKs are to be transmitted on a physical uplink control channel or on a physical uplink shared channel is built into a chip in an executable manner.

(v) Further, an integrated circuit according to the present invention is an integrated circuit used in a mobile station device that communicates with a base station device, wherein a series of functions including a function for dividing a plurality of ACKs/NACKs indicating success or failure of decoding of a plurality of pieces of uplink data received from the base station device, a function for separately encoding the divided ACKs/NACKs, and a function for changing a method for concatenating the encoded bits of the separately encoded ACKs/NACKs in accordance with a modulation scheme of uplink data on a physical uplink shared channel on which the ACKs/NACKs are to be transmitted is built into a chip in an executable manner.

(w) Further, an integrated circuit according to the present invention is an integrated circuit used in a mobile station device that communicates with a base station device, wherein a series of functions including a function for dividing a plurality of ACKs/NACKs indicating success or failure of decoding of a plurality of pieces of uplink data received from the base station device, a function for separately encoding the divided ACKs/NACKs, and a function for transmitting each of the encoded bits of the separately encoded ACKs/NACKs to the base station device in a different time symbol on a physical uplink shared channel is built into a chip in an executable manner.

(x) Further, an integrated circuit according to the present invention is an integrated circuit used in a mobile station device that communicates with a base station device, wherein a series of functions including a function for dividing a plurality of ACKs/NACKs indicating success or failure of decoding of a plurality of pieces of uplink data received from the base station device, and a function for calculating the number of encoded bits of each of the divided ACKs/NACKs using the number of bits of each of the ACKs/NACKs is built into a chip in an executable manner.

(y) Further, an integrated circuit according to the present invention is an integrated circuit used in a base station device that communicates with a mobile station device, wherein a series of functions including a function for, using the mobile station device, dividing a plurality of ACKs/NACKs indicating success or failure of decoding of a plurality of pieces of uplink data received from the base station device, separately encoding the divided ACKs/NACKs, changing a method for concatenating the encoded bits of the separately encoded ACKs/NACKs in accordance with whether the ACKs/NACKs are to be transmitted on a physical uplink control channel or a physical uplink shared channel, and transmitting an ACK/NACK signal generated from the concatenated encoded bits of the ACKs/NACKs on a physical uplink control channel or a physical uplink shared channel, and receiving the ACK/NACK signal from the mobile station device, and a function for performing a decoding process on the received ACK/NACK signal is built into a chip in an executable manner.

(z) Further, an integrated circuit according to the present invention is an integrated circuit used in a base station device that communicates with a mobile station device, wherein a series of functions including a function for, using the mobile station device, dividing a plurality of ACKs/NACKs indicating success or failure of decoding of a plurality of pieces of uplink data received from the base station device, separately encoding the divided ACKs/NACKs, changing a method for concatenating the encoded bits of the separately encoded ACKs/NACKs in accordance with a modulation scheme of uplink data on a physical uplink shared channel on which the ACKs/NACKs are to be transmitted, and transmitting an ACK/NACK signal generated from the concatenated encoded bits of the ACKs/NACKs to the base station device on the physical uplink shared channel, and receiving the ACK/NACK signal from the mobile station device, and a function for performing a decoding process on the received ACK/NACK signal is built into a chip in an executable manner.

(A) Further, an integrated circuit according to the present invention is an integrated circuit used in a base station device that communicates with a mobile station device, wherein a series of functions including a function for, using the mobile station device, dividing a plurality of ACKs/NACKs indicating success or failure of decoding of a plurality of pieces of uplink data received from the base station device, separately encoding the divided ACKs/NACKs, and transmitting each of the encoded bits of the separately encoded ACKs/NACKs to the base station device in a different time symbol on a physical uplink shared channel, and receiving signals of the ACKs/NACKs from the mobile station device, and a function for performing a decoding process on the received signals of the ACKs/NACKs is built into a chip in an executable manner.

(B) Further, an integrated circuit according to the present invention is an integrated circuit used in a base station device that communicates with a mobile station device, wherein a function for, using the mobile station device, dividing a plurality of ACKs/NACKs indicating success or failure of decoding of a plurality of pieces of uplink data receive from the base station device, and calculating the number of encoded bits of each of the ACKs/NACKs divided by the mobile station device using the number of bits of each of the divided ACKs/NACKs is built into a chip in an executable manner.

A program operating on the base station device 3 and each of the mobile station devices 1 according to the present invention may be a program for controlling a CPU (Central Processing Unit) or the like (program for causing a computer to function) so as to implement the functions of the foregoing embodiment according to the present invention. The information handled in these devices is temporarily accumulated in a RAM (Random Access Memory) when processed, and is then stored in various ROMs such as a Flash ROM (Read Only Memory) or an HDD (Hard Disk Drive). The information is read by the CPU, if necessary, and modified or updated.

Part of the mobile station devices 1 and the base station device 3 in the foregoing embodiment may be implemented by a computer. In this case, a program for implementing this control function may be recorded on a computer-readable recording medium, and part of the mobile station devices 1 and the base station device 3 may be implemented by loading the program recorded on the recording medium into a computer system and executing the program.

The term "computer system", as used herein, refers to a computer system incorporated in the mobile station devices 1 or the base station device 3, and is used to include an OS and hardware such as peripheral devices. Further, the term "computer-readable recording medium" refers to a storage device such as a portable medium such as a flexible disk, a magneto-optical disk, a ROM, or a CD-ROM, or a hard disk incorporated in a computer system.

Additionally, the term "computer-readable recording medium" may also be used to include an object that dynamically holds a program for a short period of time, such a communication line used to transmit the program via a network such as the Internet or a communication line such as a telephone line, and an object that holds a program for a certain period of time, such as a built-in volatile memory of a computer system serving as a server or a client in this case. Further, the program described above may be configured to implement some of the functions described above, or may be implemented by combining the functions described above with a program already recorded on a computer system.

Furthermore, a part or whole of the mobile station devices 1 and the base station device 3 in the foregoing embodiment may be implemented as an LSI, which is typically an integrated circuit, or as a chip set. The functional blocks of the mobile station devices 1 and the base station device 3 may be individually built into chips, or some or all thereof may be integrated and built into a chip. The method of forming an integrated circuit is not limited to LSI, and may be implemented by a dedicated circuit or a general-purpose processor. In case of the advent of integrated circuit technology replacing LSI due to the advancement of semiconductor technology, it is also possible to use an integrated circuit based on this technology.

While an embodiment of this invention has been described in detail with reference to the drawings, a specific configuration is not limited to that described above, and a variety of design modifications and the like can be made without departing from the essence of this invention.

REFERENCE SIGNS LIST 1 (1A, 1B, 1C) mobile station device
3 base station device
101 higher layer processing unit
103 control unit
105 receiving unit
107 transmitting unit
301 higher layer processing unit
303 control unit
305 receiving unit
307 transmitting unit

The invention claimed is:
1. A wireless communication system comprising:
a base station device; and
a mobile station device wherein
the mobile station device and the base station device are configured to communicate with each other, and
the mobile station device is configured to:
generate a first ACK/NACK sequence and a second ACK/NACK sequence from ACKs/NACKs for transport blocks, the transport block being received from the base station device, the first ACK/NACK sequence being different from the second ACK/NACK sequence,
encode the first ACK/NACK sequence to generate a first coded bit sequence, and encode the second ACK/NACK sequence to generate a second coded bit sequence, the first ACK/NACK sequence and the second ACK/NACK sequence being separately encoded by using a same set of base sequences,
concatenate the first coded bit sequence and the second coded bit sequence differently based on whether the ACKs/NACKs are to be transmitted on a physical uplink control channel or on a physical uplink shared channel, and
the base station device is configured to:
perform a reception process of the ACKs/NACKs.
2. A mobile station device configured to communicate with a base station device, the mobile station device comprising:
generating circuitry configured to generate a first ACK/NACK sequence and a second ACK/NACK sequence from ACKs/NACKs for transport blocks, the transport blocks being received from the base station device, the first ACK/NACK sequence being different from the second ACK/NACK sequence,
encoding circuitry configured to encode the first ACK/NACK sequence to generate a first coded bit sequence, and encode the second ACK/NACK sequence to generate a second coded bit sequence, the first ACK/NACK sequence and the second ACK/NACK sequence being separately encoded by using a same set of base sequences, and
concatenating circuitry configured to concatenate the first coded bit sequence and the second coded bit sequence differently based on whether the ACKs/NACKs are to be transmitted on a physical uplink control channel or on a physical uplink shared channel.

3. The mobile station device according to claim 2, wherein
the concatenating circuitry is configured to alternately concatenate the two coded bit sequences in units of a certain number of bits.

4. The mobile station device according to claim 2, wherein
the concatenating circuitry is configured to concatenate one of the two coded bit sequences with the least significant bit of the other coded bit sequence.

5. A base station device configured to communicate with a mobile station device, the base station device comprising:
reception circuitry configured to perform a reception process of ACKs/NACKs; and
transmission circuitry configured to transmit transport blocks to the mobile station device, wherein
a first ACK/NACK sequence and a second ACK/NACK sequence are generated from the ACKs/NACKs for the transport blocks, the transport blocks being transmitted from the base station device, the first ACK/NACK sequence to generate a first coded bit sequence being encoded, the second ACK/NACK sequence to generate a second coded bit sequence being encoded, the first ACK/NACK sequence and the second ACK/NACK sequence being separately encoded by using a same set of base sequences, the first coded bit sequence and the second coded bit sequence being concatenated, differently based on whether the ACKs/NACKs are to be transmitted on a physical uplink control channel or on a physical uplink shared channel.

6. A wireless communication method used in a mobile station device that is configured to communicate with a base station device, the wireless communication method comprising:
generating a first ACK/NACK sequence and a second ACK/NACK sequence from ACKs/NACKs for transport blocks, the transport blocks being received from the base station device, the first ACK/NACK sequence being different from the second ACK/NACK sequence;
encoding the first ACK/NACK sequence to generate a first coded bit sequence, and encode the second ACK/NACK sequence to generate a second coded bit sequence, the first ACK/NACK sequence and the second ACK/NACK sequence being separately encoded by using a same set of base sequences; and
concatenating the first coded bit sequence and the second coded bit sequence differently based on whether the ACKs/NACKs are to be transmitted on a physical uplink control channel or on a physical uplink shared channel.

7. The wireless communication method according to claim 6, wherein said concatenating the two coded bit sequences includes alternately concatenating the two coded bit sequences in units of a certain number of bits.

8. The wireless communication method according to claim 6, wherein said concatenating the two coded bit sequences includes concatenating one of the two coded bit sequences with the least significant bit of the other coded bit sequence.

9. A wireless communication method used in a base station device that is configured to communicate with a mobile station device, the wireless communication method comprising:
performing a reception process of ACKs/NACKs, wherein
a first ACK/NACK sequence and a second ACK/NAKC sequence are generated from the ACKs/NACKs for transport blocks, the transport blocks being transmitted from the base station device, the first ACK/NACK sequence to generate a first coded bit sequence being encoded, the second ACK/NACK sequence to generate a second coded bit sequence being encoded, the first ACK/NACK sequence and the second ACK/NACK sequence being separately encoded by using a same set of base sequences, the first coded bit sequence and the second coded bit sequence being concatenated, differently based on whether the ACKs/NACKs are to be transmitted on a physical uplink control channel or on a physical uplink shared channel.

10. An integrated circuit used in a mobile station device that is configured to communicate with a base station device, the integrated circuit comprising:
generating circuitry configured to generate a first ACK/NACK sequence and a second ACK/NACK sequence from ACKs/NACKs for transport blocks, the transport blocks being received from the base station device, the first ACK/NACK sequence being different from the second ACK/NACK sequence;
encoding circuitry configured to encode the first ACK/NACK sequence to generate a first coded bit sequence, and encode the second ACK/NACK sequence to generate a second coded bit sequence, the first ACK/NACK sequence and the second ACK/NACK sequence being separately encoded by using a same set of base sequences; and
concatenating circuitry configured to concatenate the first coded bit sequence and the second coded bit sequence differently based on whether the ACKs/NACKs are to be transmitted on a physical uplink control channel or on a physical uplink shared channel.

11. The integrated circuit according to claim 10, wherein the concatenating circuitry is configured to alternately concatenate the two coded bit sequences in units of a certain number of bits.

12. The integrated circuit according to claim 10, wherein the concatenating circuitry is configured to concatenate one of the two coded bit sequences with the least significant bit of the other coded bit sequence.

13. An integrated circuit used in a base station device that is configured to communicate with a mobile station device, the integrated circuit comprising:
reception circuitry configured to perform a reception process of ACKs/NACKs; and
transmission circuitry configured to transmit transport blocks to the mobile station device, wherein
a first ACK/NACK sequence and a second ACK/NACK sequence are generated from ACKs/NACKs for the transport blocks, the transport blocks being transmitted from the base station device, the first ACK/NACK sequence to generate a first coded bit sequence being encoded, the second ACK/NACK sequence to generate a second coded bit sequence being encoded, the first ACK/NACK sequence and the second ACK/NACK sequence being separately encoded by using a same set of base sequences, the first coded bit sequence and the second coded bit sequence being concatenated, differently based on whether the ACKs/NACKs are to be transmitted on a physical uplink control channel or on a physical uplink shared channel.

* * * * *